(12) United States Patent
Kumashiro et al.

(10) Patent No.: US 11,273,761 B2
(45) Date of Patent: Mar. 15, 2022

(54) VEHICLE EXIT ASSIST APPARATUS

(71) Applicant: TOYOTA JIDOSHA KABUSHIKI KAISHA, Toyota (JP)

(72) Inventors: Takuto Kumashiro, Toyota (JP); Noriyuki Saitoh, Toyota (JP); Iwao Izumikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 16/548,078

(22) Filed: Aug. 22, 2019

(65) Prior Publication Data
US 2020/0148108 A1 May 14, 2020

(30) Foreign Application Priority Data
Nov. 12, 2018 (JP) .............................. JP2018-212057

(51) Int. Cl.
| | | |
|---|---|---|
| *E05B 77/04* | (2014.01) | |
| *B60Q 9/00* | (2006.01) | |
| *G07C 5/08* | (2006.01) | |

(52) U.S. Cl.
CPC .............. *B60Q 9/008* (2013.01); *E05B 77/04* (2013.01); *G07C 5/0816* (2013.01)

(58) Field of Classification Search
None
See application file for complete search history.

(56) References Cited

U.S. PATENT DOCUMENTS

| | | | |
|---|---|---|---|
| 7,192,172 B1 * | 3/2007 | Alberti ................ | B60Q 1/2665 362/259 |
| 10,086,833 B1 * | 10/2018 | Duan ...................... | G01S 15/87 |
| 10,549,696 B2 * | 2/2020 | Inoue ..................... | H04N 7/181 |
| 2005/0085972 A1 * | 4/2005 | Martinez ................ | E05C 17/00 701/49 |
| 2006/0254142 A1 * | 11/2006 | Das ....................... | B60R 21/013 49/26 |

(Continued)

FOREIGN PATENT DOCUMENTS

| | | |
|---|---|---|
| JP | 2011-113366 A | 6/2011 |
| JP | 4840183 B2 | 12/2011 |

(Continued)

*Primary Examiner* — Muhammad Adnan
(74) *Attorney, Agent, or Firm* — Sughrue Mion, PLLC

(57) ABSTRACT

A vehicle exit assist apparatus with improved security and power consumption includes an exit restriction part including a warning and/or door opening restriction when an occupant's exit action is detected and an obstacle around a self-vehicle is detected by an obstacle detection part. The obstacle detection part and the exit restriction part are started when the exit action is detected in a situation where the obstacle detection part and/or the exit restriction part are not working. The obstacle detection part may transmit a signal corresponding to its operating state after starting-up and the exit restriction part may be forced to perform the exit restriction action when the obstacle detection part is not operating normally based on the signal. It may be configured to cancel the exit restriction action when such a compulsory exit restriction action is being continuously performed for a period longer than a predetermined period.

10 Claims, 19 Drawing Sheets

(56) References Cited

U.S. PATENT DOCUMENTS

| | | | |
|---|---|---|---|
| 2008/0218381 A1* | 9/2008 | Buckley | B60Q 1/50 340/932.2 |
| 2012/0194356 A1* | 8/2012 | Haines | B60Q 1/323 340/933 |
| 2013/0234844 A1* | 9/2013 | Yopp | B60Q 9/008 340/435 |
| 2018/0050704 A1* | 2/2018 | Tascione | B60W 10/04 |
| 2018/0086268 A1* | 3/2018 | Kochiya | H04N 5/232941 |
| 2019/0139411 A1* | 5/2019 | Dhull | G09F 19/18 |
| 2019/0211587 A1* | 7/2019 | Ganeshan | B60R 21/0153 |
| 2021/0225168 A1* | 7/2021 | Hoh | E05B 77/00 |

FOREIGN PATENT DOCUMENTS

| | | |
|---|---|---|
| JP | 4866314 B2 | 2/2012 |
| JP | 2018-008576 A | 1/2018 |
| JP | 2018-047833 A | 3/2018 |

* cited by examiner

VEHICLE EXIT ASSIST APPARATUS

TECHNICAL FIELD

The present invention relates to a vehicle exit assist apparatus. More specifically, the present invention relates to a vehicle exit assist apparatus which detects an obstacle around a vehicle to improve security when an occupant exits (gets out).

BACKGROUND ART

In the art, in order to improve security when an occupant opens a door to exit from a stopped vehicle such as an automobile, various vehicle exit assist apparatuses which detect an obstacle around the vehicle, such as an approaching object which approaches from behind, for example, and call for attention by a warning, etc., have been proposed conventionally.

For example, in the Patent Document 1 (PTL1), a door lock control apparatus which comprises an obstacle detection part for detecting an obstacle around a vehicle based on image data around the vehicle photographed with a camera mounted on the vehicle and makes a door lock operation switch disable when an obstacle is detected by the obstacle detection part during a stop of the vehicle, has been proposed. In accordance with the apparatus, security when opening a door can be improved.

In the Patent Document 2 (PTL2), a vehicle door opening-and-closing assist system which calls for attention by a warning or limits an opening angle of a door, etc., in a case where a door opening judgment line which is set based on stop location information of a self-vehicle and information about an approach object behind the self-vehicle overlaps with a range of opening motion of the door, when opening operation is done for the door, has been proposed. In accordance with the system, while contact or collision with the approaching object can be certainly prevented to ensure safety of an occupant when the occupant exits from the vehicle, unnecessary operation for attention-seeking can be suppressed to assist the occupant to smoothly exit.

Moreover, in the Patent Document 3 (PTL3), an electronic mirror power supply control system in an electronic mirror system which fulfills a function as a mirror with a camera and a monitor, which comprises a display control part configured to output, as a signal, intention of a driver to use a mirror and supplies electric power to an electronic mirror when electric power is not supplied to the electronic mirror and the above-mentioned signal is output by the display control part, has been proposed. In accordance with the system, a system which can be operated easily and can reduce a load of a battery while fulfilling functions as an electronic mirror, can be provided.

Furthermore, in the Patent Document 4 (PTL4), an approaching object detection apparatus, which continues detection of an approaching object which approaches a vehicle based on a photographed image with an on-vehicle camera when an occupant is detected in the vehicle by an occupant detection means and ends the detection of an approaching object when an occupant is not detected in the vehicle by the occupant detection means, even in a state where the vehicle has stopped and an ignition switch has been turned off, has been proposed. Thereby, even in a state where an ignition switch has been turned off, an object approaching the vehicle can be detected until all the occupants on the vehicle complete exiting.

In addition, in the Patent Document 5 (PTL5), a vehicle surrounding photographing display apparatus, which stops display with a monitor after continuing photographing with a camera and displaying with the monitor for a predetermined period even in a case where an ignition switch has been turned off, has been proposed. Moreover, the apparatus restarts display with the monitor to make it possible to check surrounding of a vehicle in a case where display with the monitor has been stopped when opening of a door is detected by a courtesy switch and thereafter stops display with the monitor when closing of the door is detected by the courtesy switch and locking of the door is detected with a door lock. Thereby, surrounding of the vehicle can be checked when exiting while suppressing power consumption.

CITATION LIST

Patent Literature

[PTL1] Japanese Patent No. 4840183
[PTL2] Japanese Patent Application Laid-Open (kokai) No. 2018-008576
[PTL3] Japanese Patent No. 4866314
[PTL4] Japanese Patent Application Laid-Open (kokai) No. 2011-113366
[PTL5] Japanese Patent Application Laid-Open (kokai) No. 2018-047833

SUMMARY OF INVENTION

Technical Problem

The door lock control device described in the Patent Document 1 makes the door lock operation switch into a disable state when the obstacle detection part detects an obstacle around the vehicle in a state where the ignition switch has been turned on and the electric power is supplied, for example (refer to paragraph of the Patent Document 1). Therefore, there is a possibility that the obstacle detection part cannot detect an obstacle even when the obstacle exists around the vehicle and the door of the vehicle may be opened, in a state where the ignition switch has been turned off and the electric power is not supplied, for example.

The vehicle door opening-and-closing support system described in the Patent Document 2 is intended to suppress unnecessary operation for attention-seeking while preventing a contact or a collision with an approaching object by performing attention-seeking with a warning or restriction of an opening angle of a door, etc., only when a region where there is a possibility of the contact or collision with the approaching object may overlap with a region where the door is opened. However, for example, the operation of the system after the ignition switch has been turned off and the power supply has been stopped is not taken into consideration at all.

Moreover, the electronic mirror power supply control system described in the Patent Document 3 restarts power supply when a signal which shows a driver's intention to use the mirror in a state where electric power is not supplied to the electronic mirror is output. However, since the system does not comprise a function to detect an obstacle around the vehicle to issue a warning and only the function as an electronic mirror is revived, it does not have superiority over a vehicle which comprises only a conventional optical mirror, from a viewpoint of ensuring safety when a occupant exits (gets out).

Furthermore, the approaching object detection apparatus described in the Patent Document 4 continues detection of an approaching object which approaches the vehicle based on a photographed image with an on-vehicle camera when an occupant is detected in the vehicle by the occupant detection means, even in a state where the vehicle has stopped and an ignition switch has been turned off. In other words, in accordance with this apparatus, detection of an approaching object is continued until a state where no occupant is detected in the vehicle is attained. Therefore, since detection of an approaching object is continued even when the occupant is not going to exit, for example, when an occupant stays and rests in a stopped vehicle, there is a possibility that an unnecessary warning is issued to give discomfort to the occupant and/or increase load of a battery.

In addition, the vehicle surrounding photographing display apparatus described in the Patent Document 5 stops display with the monitor after continuing photographing with the camera and displaying with the monitor for a predetermined period even in the case where the ignition switch has been turned off. Moreover, the apparatus restarts display with the monitor to make it possible to check surrounding of the vehicle when opening of the door is detected by the courtesy switch after the display with the monitor has been stopped as the above. Since the display with the monitor is restarted after the opening of the door is detected in this way, there is a possibility that attention-seeking cannot be performed by issuing a warning, etc., before the opening of the door is detected, even in a case where an obstacle, such as an approaching object which approaches from behind, exists around the vehicle.

As mentioned above, in the vehicle exit assist apparatuses according to conventional technologies, problems to be solved still remains, from a viewpoint of more certain improvement of security when an occupant exits while reducing unnecessary power consumption. Namely, in the art, a vehicle exit assist apparatus which can more certainly improve security when an occupant exits (gets out) while reducing unnecessary power consumption is demanded.

Solution to Problem

Therefore, as a result of earnest research, the inventor has found that, in a vehicle exit assist apparatus which makes an exit restriction part perform an exit restriction action including a warning and/or door opening restriction when an obstacle around a self-vehicle is detected by an obstacle detection part, security when an occupant exits can be more certainly improved while reducing unnecessary power consumption by starting up the obstacle detection part and the exit restriction part when the occupant's exit action is detected in a state where the obstacle detection part and/or the exit restriction part are not working.

More specifically, a vehicle exit assist apparatus according to the present invention (which may be referred to as a "present invention apparatus" hereafter) is a vehicle exit assist apparatus which comprises an obstacle detection part, an exit restriction part, and a control part. The obstacle detection part is configured to detect an obstacle existing around a self-vehicle. The exit restriction part is configured to perform an exit restriction action that is an action including a warning action and/or a door opening restriction action. The warning action is an action to issue a warning on a door which the self-vehicle comprises. The door opening restriction action is an action to restrict opening of the door which the self-vehicle comprises. The control part is configured to perform regular control. The regular control is control, in which the exit restriction part is made to perform the exit restriction action at least on the door nearest to the obstacle when the obstacle is detected by the obstacle detection part.

The present invention apparatus further comprises an exit action detection part. The exit action detection part is configured to detect an exit action that is an action of the occupant of the self-vehicle to exit (get out of the self-vehicle). Furthermore, the control part is configured to perform restart control. The restart control is control, in which the obstacle detection part and the exit restriction part are restarted when the exit action is detected by the exit action detection part in a state where the obstacle detection part and/or the exit restriction part are not working.

In the present invention apparatus according to an aspect of the present invention, the obstacle detection part may be configured to transmit a signal corresponding to its operating state after starting-up and the exit restriction part may be configured to be forced to perform the exit restriction action when it is judged that the obstacle detection part is not operating normally based on the signal. In the present invention apparatus according to another aspect of the present invention, it may be configured to cancel the exit restriction action when the exit restriction action compulsorily performed as the above is being continuously performed for a period longer than a predetermined period.

Advantageous Effects of Invention

In accordance with the present invention, a vehicle exit assist apparatus which can more certainly improve security when an occupant exits while reducing unnecessary power consumption can be provided.

Other objective, other features, and accompanying advantages of the present invention will be easily understood from the explanation about respective embodiments of the present invention, which will be mentioned hereafter referring to drawings.

DESCRIPTION OF EMBODIMENTS

First Embodiment

Hereafter, a vehicle exit assist apparatus according to a first embodiment of the present invention (which may be referred to as a "first apparatus" hereafter) will be explained referring to drawings.
<Configuration>

Figure 1:
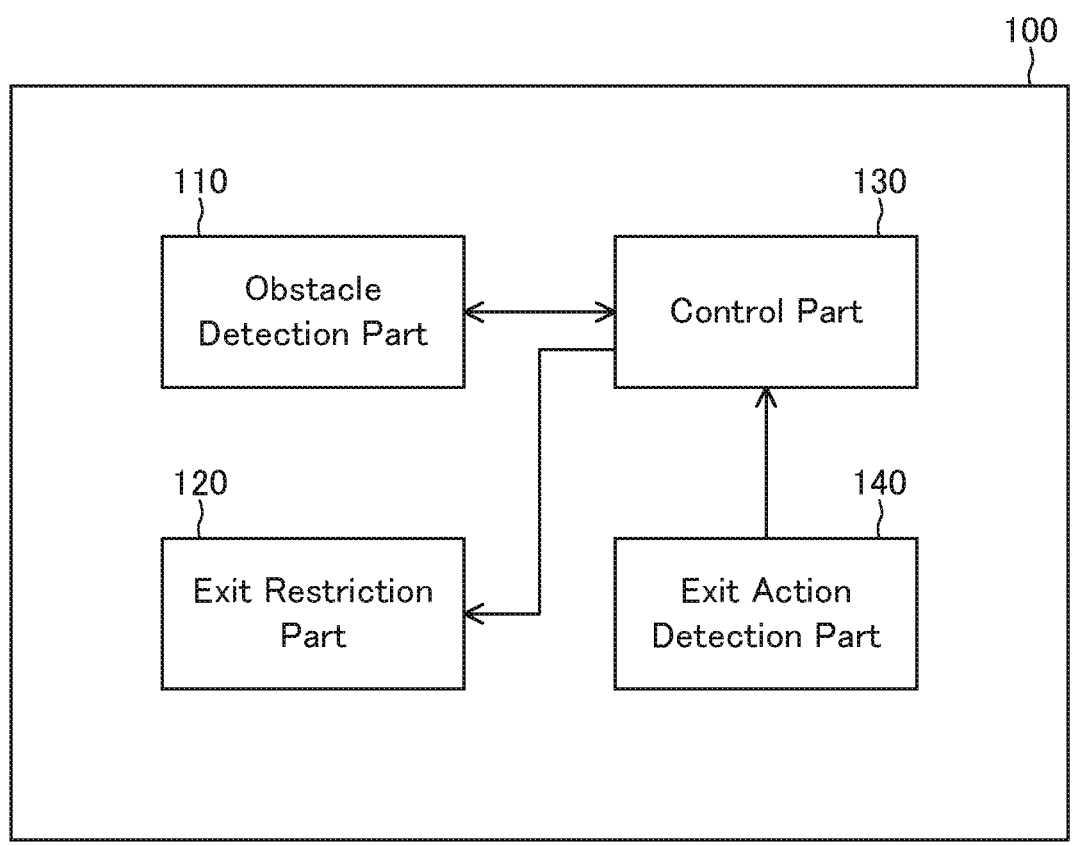
FIG. 1 is a schematic block diagram for showing an example of a configuration of a vehicle exit assist apparatus according to a first embodiment of the present invention (first apparatus).

FIG. 1 is a schematic block diagram for showing an example of a configuration of the first apparatus. The first apparatus 100 is a vehicle exit assist apparatus which comprises an obstacle detection part 110, an exit restriction part 120 and a control part 130.

The obstacle detection part 110 is configured to detect an obstacle (not shown) existing around a self-vehicle (not shown). The obstacle existing around the self-vehicle means an object, animal, a pedestrian, a vehicle (for example, a bicycle, a two-wheel automobile (motorcycle), a four-wheel automobile, etc.) which exists within a predetermined distance from a self-vehicle, and an approaching body (including an object, an animal, a pedestrian, a vehicle, etc.) predicted to reach within a predetermined distance from a self-vehicle within predetermined time, etc., for example. Especially, it means an approaching body predicted to reach a movable range of a door of a self-vehicle in its opening-and-closing action (switching action) and/or a location of an occupant immediately after exiting from (getting out of) the self-vehicle, etc., within predetermined time, based on an index such as TTC (Time-To-Collision) and/or MTC (Margin-To-Collision), for example.

A specific means for the obstacle detection part 110 to detect an obstacle as described above is not limited in particular, and various detection means which it is widely used in the art can be adopted. Such a detection means can detect a location and speed of an obstacle (including a relative location and speed of the obstacle with respective to a self-vehicle) and distance between the self-vehicle and the obstacle, etc., by means of various sensors such as a radar using a reflected wave of a radio wave, such as a millimeter wave, an ultrasonic sensor using a reflected wave of an ultrasonic wave, and an image sensor using image data photographed with a camera such as a monocular camera (single-lens camera) and a stereoscopic camera, for example. The obstacle detection part 110 is configured to transmit a signal indicating that an obstacle existing around a self-vehicle has been detected in this way, to the control part 130.

The exit restriction part 120 is configured to perform an exit restriction action that is an action including a warning action and/or a door opening restriction action. Namely, the exit restriction part 120 is configured to perform either one or both of the warning action and the door opening restriction action as the exit restriction action.

The warning action is an action to issue a warning on a door which the self-vehicle comprises. As specific examples of warnings, generation of sound, light and/or vibration, and display (indication) of images and/or letters, etc. can be mentioned, for example. Sound as a warning can be generated from a sound generation device that is a device to generate sound, such as an audio instrument and/or a buzzer, etc. which the self-vehicle comprises, for example. In addition, as specific examples of such sound, sounds (for example, an alarm sound etc.), voices (including a synthesized voice) and music, etc. can be mentioned, for example. Light as a warning can be generated from an electric lamp and/or a light emitting element (for example, a light emitting diode (LED), etc.), etc. which a light generation device that is a device to generate light comprises, for example. As specific examples of the light generation device, a warning lamp which a blind spot monitor (BSM) system and/or a door indicator mounted on a self-vehicle, etc. comprise, etc., for example.

Vibration as a warning can be generated from a vibration generation device that is a device to generate vibration, such as a motor and/or a vibrator, etc. built in a self-vehicle for vibrating a handle and/or a sheet, etc. which the self-vehicle comprises. Images and/or letters as a warning can be displayed with an image display device to displays images and/or letters, such as a multi-information display (MID) and/or a display of a multi-media (MM) equipment, etc. which a self-vehicle comprises, for example. As specific examples of such images, still images (for example, figures, patterns and marks, etc.) and moving images (for example, animations, etc.), etc. can be mentioned, for example.

As mentioned above, the exit restriction part 120 can comprise at least one warning device chosen from a group consisting of the above-mentioned sound generation device, light generation device, vibration generation device and image display device. In this case, the warning action can include an action to issue the warning with these warning devices.

On the other hand, the door opening restriction action is an action to restrict opening of the door which the self-vehicle comprises. As a specific example of the action to restrict opening of the door which the self-vehicle comprises, an action to forbid opening of the door which the self-vehicle comprises and/or an action to delay opening of the door which the self-vehicle comprises, etc., can be mentioned, for example.

For example, the exit restriction part 120 can comprise a door lock apparatus that is an apparatus to lock the door or maintain a state where the door is locked. In this case, the exit restriction part 120 can comprise a latch assembly for the door which the self-vehicle comprises, for example, and the door opening restriction action can include an action to lock the door with the door lock apparatus or an action to maintain the state where the door is locked.

The control part 130 is configured to perform regular control. The regular control is control, in which the exit restriction part 120 is made to perform the exit restriction action at least on the door nearest to the obstacle when the obstacle is detected by the obstacle detection part 110.

The control part 130 may make the exit restriction part 120 perform the exit restriction action only on the door nearest to the obstacle detected by the obstacle detection part 110 (nearest door), may make the exit restriction part 120 perform the exit restriction action on doors other than the nearest door (for example, a door adjacent to the nearest door), or may make the exit restriction part 120 perform the exit restriction action on all the doors which the self-vehicle comprises.

In addition to the above, the first apparatus 100 further comprises an exit action detection part 140. The exit action detection part 140 is configured to detect an exit action that is an action of the occupant of the self-vehicle to exit (get out of the self-vehicle). As specific examples of the exit action, an operation and/or contact by the occupant of the self-vehicle to a door lever and/or a door switch for operating an electronic latch apparatus (for example, an unlatch switch, etc.) of the door which the self-vehicle comprises, a predetermined change in a sitting posture of the occupant (for example, a change of the occupant's sitting posture expected when exiting, etc.), and movement of the occupant (for example, movement of the occupant expected when exiting, etc.), etc.

Therefore, the exit action detection part 140 can comprise at least one detection device chosen from a group consisting of a door lever sensor to detect an operation of the door lever, a door switch for operating the electronic latch apparatus, a touch sensor to detect contact by the occupant to the door lever and/or the door switch, a seating sensor to detect the sitting posture of the occupant, and a motion sensor to detect the movement of the occupant. In this case, the exit action detection part 140 may be configured to detect the exit action based on a signal output from the detection device.

Furthermore, in the first apparatus 100, the control part 140 is configured to perform restart control. The restart control is control, in which the obstacle detection part 110 and the exit restriction part 120 are restarted when the exit action is detected by the exit action detection part 140 in a state where the obstacle detection part 110 and/or the exit restriction part 120 are not working. Specifically, the restart control is control, in which power supply to the obstacle detection part 110 and the exit restriction part 120 is restarted when the exit action is detected by the exit action detection part 140 in a state where power supply to the obstacle detection part 110 and/or the exit restriction part 120 has been already stopped after an ignition switch of the self-vehicle is turned off, for example. A power supply used when restarting the power supply to the obstacle detection part 110 and the exit restriction part 120 by the restart control may be a power supply used when the ignition switch of the self-vehicle has been turned on (regular power supply), or may be a power supply separate from the regular power supply.

Moreover, as mentioned above, the exit action detection part 140 needs to be able to detect the exit action also in a state where the power supply to the obstacle detection part 110 and/or the exit restriction part 120 has been already stopped after the ignition of the self-vehicle is switched off, for example. Therefore, power supply to the exit action detection part 140 needs to be maintained even in a state where the ignition switch has not been turned on, like a smart entry system or a keyless entry system, for example.

The above-mentioned functions as the control part 130 can be realized with an electronic controller (ECU: Electric Control Unit) which the self-vehicle comprises, for example. The ECU comprises a microcomputer as a principal part, and comprises an input port for receiving detection signals from the obstacle detection part 110 and the exit action detection part 140, etc., and an output port for transmitting instruction signals to the obstacle detection part 110 and the exit restriction part 120, etc. These detection signals and instruction signals can be transmitted through an on-vehicle network (onboard network), such as a CAN (Controller Area Network), for example. The microcomputer comprises a CPU (Central Processing Unit) and a data storage unit, such as a ROM and a RAM, etc., for example. The CPU is configured to realize various functions by receiving various detection signals, performing various operation processing and transmitting various instruction signals, based on instructions (program) stored in the ROM. The ECU can realize the functions as the control part 130 in this way.

In addition, the functions as the control part 130 may be realized by an ECU which the first apparatus 100 comprises, or may be realized by an ECU which an apparatus other than the first apparatus 100 mounted on the self-vehicle comprises. Furthermore, the functions as the control part 130 may be realized by one ECU, or may be dispersively realized by a plurality of ECUs.

<Operation>

Figure 2:
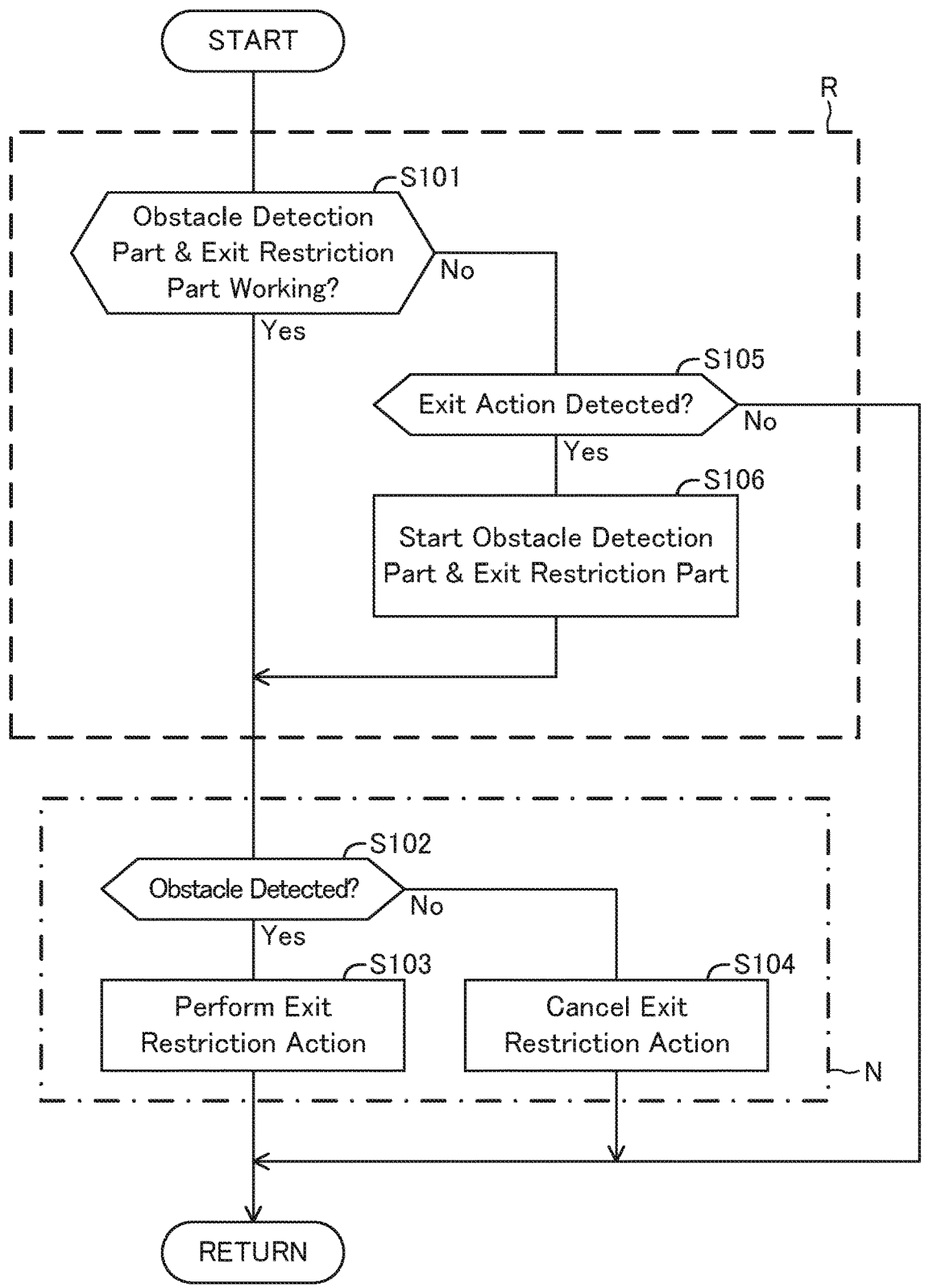
FIG. 2 is a flowchart for showing an example of an exit assist routine performed by a control part which the first apparatus comprises.

FIG. 2 is a flowchart for showing an example of the exit assist routine performed in the control part 130 which the first apparatus 100 comprises. Such an exit assist routine is repeatedly performed at a predetermined interval by the CPU of the ECU which realizes the functions as the control part 130.

Once the exit assist routine is started, the CPU judges whether both the obstacle detection part 110 and the exit restriction part 120 are working or not in Step S101. When both the obstacle detection part 110 and the exit restriction part 120 are working, the CPU judges as "Yes" in Step S101, and progresses processing to the following Step S102.

In Step S102, the CPU judges whether an obstacle which exists around the self-vehicle is detected or not. When an obstacle is detected by the obstacle detection part 110, the CPU judges as "Yes" in Step S102, progresses processing to the following Step S103, and makes the exit restriction part 120 perform the exit restriction action. Thereby, the warning action and/or the door opening restriction action are performed at least on the door nearest to the obstacle detected by the obstacle detection part 110, and security when an occupant exits from (gets out of) the self-vehicle can be improved more certainly. On the other hand, when no obstacle is detected by the obstacle detection part 110, the CPU judges as "No" in Step S102, progresses processing to the following Step S104, cancels the exit restriction action when the exit restriction action is being performed by the exit restriction part 120, and once ends this routine. Thereby, it becomes possible to unlatch and/or open a door which the self-vehicle comprises according to operation by the occupant to the door lever and/or the door switch for operating the electronic latch apparatus of the door, for example. The processing performed in these Steps S102 to S104 constitutes the above-mentioned "regular control" (refer to a region N surrounded by a dash-dot line in FIG. 2).

On the other hand when either or both of the obstacle detection part 110 and the exit restriction part 120 are not working, the obstacle detection part 110 cannot detect an obstacle and the exit restriction part 120 cannot perform the exit restriction action even in a situation where an obstacle exists around the self-vehicle and an occupant is going to exit, in a vehicle exit assist apparatus according to a conventional technology.

However, in the first apparatus 100, when either or both of the obstacle detection part 110 and the exit restriction part 120 are not working, the CPU judges as "No" in Step S101, and progresses processing to the following Step S105.

In Step S105, the CPU judges whether the exit action (action of an occupant to exit from (get out of) the self-vehicle) is detected or not. When the exit action is not detected by the exit action detection part 140, the CPU judges as "No" in Step S105, and once ends this routine.

On the other hand, when the exit action is detected by the exit action detection part 140, the CPU judges as "Yes" in Step S105, and progresses processing to the following Step S106. In Step S106, the CPU starts up the obstacle detection part 110 and the exit restriction part 120 (namely, restart the operation of either or both not working among the obstacle detection part 110 and the exit restriction part 120). The processing performed in these Steps S105 and S106 constitutes the above-mentioned "restart control" (refer to the region R surrounded by a broken line in FIG. 2).

After starting up the obstacle detection part 110 and the exit restriction part 120 by performing the above-mentioned Step S106, the CPU progresses processing to the following Steps S102 to S104, and performs the above-mentioned regular control (region N). Steps S102 to S104 which constitute the regular control had been already explained.

<Effectiveness>

As mentioned above, in the first apparatus 100, the restart control is performed by the control part 130 and the obstacle detection part 110 and the exit restriction part 120 are started up when the exit action is detected by the exit action detection part 140, even in a state where the obstacle detection part 110 and/or the exit restriction part 120 are not working. Therefore, the above-mentioned regular control (region N) can be performed. In other words, in accordance with the first apparatus 100, an obstacle can be detected by the obstacle detection part 110 and the exit restriction action can be performed by the exit restriction part 120 when an obstacle exists around the self-vehicle, when an occupant of the self-vehicle is going to exit (get out), even in a state where the power supply to the obstacle detection part 110 and/or the exit restriction part 120 has been already stopped after an ignition switch of the self-vehicle is turned off, for example. Namely, security when an occupant exits from (gets out of) the self-vehicle can be improved more certainly.

Furthermore, after the ignition switch is turned off and the obstacle detection part 110 and/or the exit restriction part 120 stop the operations, the obstacle detection part 110 and the exit restriction part 120 are not started unless the ignition switch is turned on again and/or the exit action is detected by the exit action detection part 140 and the above-mentioned restart control (region R) is performed, for example. Therefore, the possibility that the regular control may be performed to give discomfort to the occupant and/or consume unnecessary electric power in a state where the vehicle exit assist is not needed, such as a state where no occupant is in the self-vehicle and a state where no occupant is going to exit, for example, can be reduced.

Namely, in accordance with the first apparatus, security when an occupant exits can be improved more certainly, while reducing unnecessary power consumption.

<Modification 1-1>

In the above-mentioned explanation, as a specific example of the restart control, control, in which the control part 130 restarts power supply to the obstacle detection part 110 and the exit restriction part 120 when the exit action is detected by the exit action detection part 140 in a state where the power supply to the obstacle detection part 110 and/or the exit restriction part 120 has been already stopped after the ignition switch of the self-vehicle is turned off, is exemplified.

However, the control part 130 may be configured to transmit a signal indicating that the exit action is detected by the exit action detection part 140 (exit action detection signal) to the obstacle detection part 110 and the exit restriction part 120 and the obstacle detection part 110 and the exit restriction part 120 may be configured to perform start processing (activation processing) when the signal is received from the control part 130. In this case, the obstacle detection part 110 and the exit restriction part 120 need to have function to be started up in response to the reception of the exit action detection signal even after the ignition switch of the self-vehicle is turned off. Therefore, it is necessary to maintain the obstacle detection part 110 and the exit restriction part 120 in what is called "sleep state" to keep at least a part required to attain the above-mentioned function in operation after the ignition switch of the self-vehicle is turned off, for example.

Figure 3:
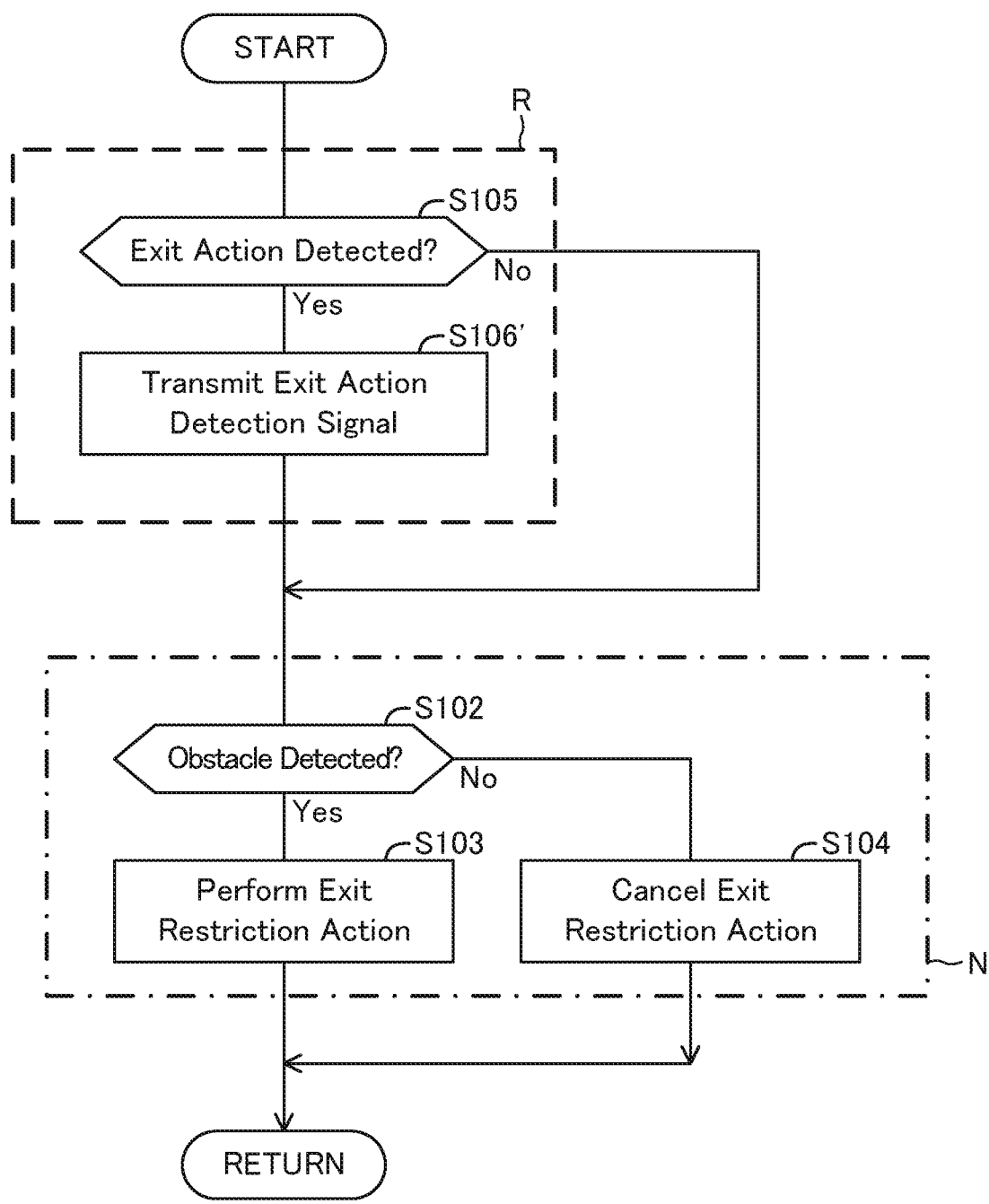
FIG. 3 is a flowchart for showing an example of an exit assist routine performed by a control part which the first apparatus according to Modification 1-1 comprises.

FIG. 3 is a flowchart for showing an example of an exit assist routine performed by the control part 130 which the first apparatus according to Modification 1-1 comprises. In this exit assist routine, Step S101, in which the CPU judges whether both the obstacle detection part 110 and the exit restriction part 120 are working or not in the exit assist routine shown in FIG. 2, is deleted. Furthermore, Step S106, in which the obstacle detection part 110 and the exit restriction part 120 are started up in the exit assist routine shown in FIG. 2, is replaced with Step S106', in which the above-mentioned exit action detection signal is transmitted to the obstacle detection part 110 and the exit restriction part 120. Therefore, once this exit assist routine is started, the CPU judges whether the exit action is detected by the exit action detection part 140 or not in Step S105. When the exit action is detected, the CPU progresses processing to the following Step S106', and transmits the exit action detection signal to the obstacle detection part 110 and the exit restriction part 120. On the other hand, when the exit action is not detected, the CPU judges as "No" in Step S105, and does not transmit the exit action detection signal.

Figure 4:
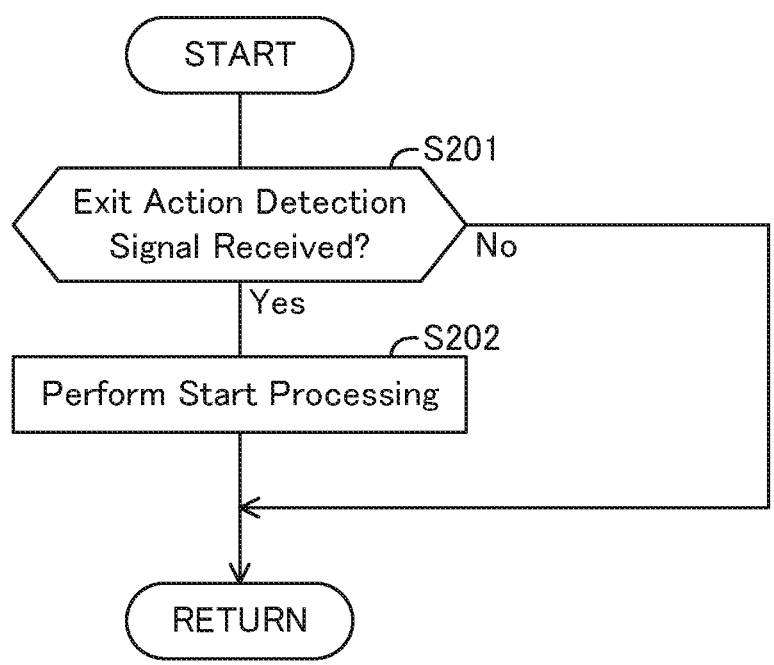
FIG. 4 is a flowchart for showing an example of restart control performed when an obstacle detection part and an exit restriction part, which the first apparatus according to the Modification 1-1 comprises, are in a sleep state.

FIG. 4 is a flowchart for showing an example of the restart control performed when the obstacle detection part 110 and the exit restriction part 120, which the first apparatus 100 according to the Modification 1-1 comprises, are in the sleep state. Once the restart control routine is started, the CPU of the ECU which realizes the functions as the obstacle detection part 110 and the exit restriction part 120, judges whether the exit action detection signal is received from the control part 130 or not in Step S201. As mentioned above about FIG. 3, when the exit action is detected (Step S105: Yes) and the exit action detection signal is received from the control part 130, the CPU judges as "Yes" in Step S201, progresses processing to the following Step S202, and performs the start processing of the obstacle detection part 110 and the exit restriction part 120. On the other hand, as mentioned above about FIG. 3, when the exit action is not detected (Step S105: No) and the exit action detection signal is not received from the control part 130, the CPU judges as "No" in Step S201, and once ends this routine. Namely, when the exit action is not detected, even in the state where the obstacle detection part 110 and the exit restriction part 120 are not working, the start processing of the obstacle detection part 110 and the exit restriction part 120 is not performed. Therefore, unnecessary exit restriction action is prevented from being performed to consume electric power wastefully.

The restart control routine as mentioned above is repeatedly performed at a predetermined interval by the CPU of the ECU which realizes the functions as the obstacle detection part 110 and the exit restriction part 120 in the sleep state. Therefore, this routine is repeatedly performed until the exit action detection signal is received from the control part 130 and the start processing is performed (namely, standing by until the exit action detection signal is received from the control part 130).

As mentioned above, in the first apparatus 100 according to the Modification 1-1 exemplified in FIG. 3 and FIG. 4, the above-mentioned restart control is performed by a combination of Step S105 and S106' included in the exit assist routine shown in FIG. 3 and the restart control routine shown in FIG. 4 (for detail, refer to a Working Example which will be mentioned later).

<Modification 1-2>

Figure 5:
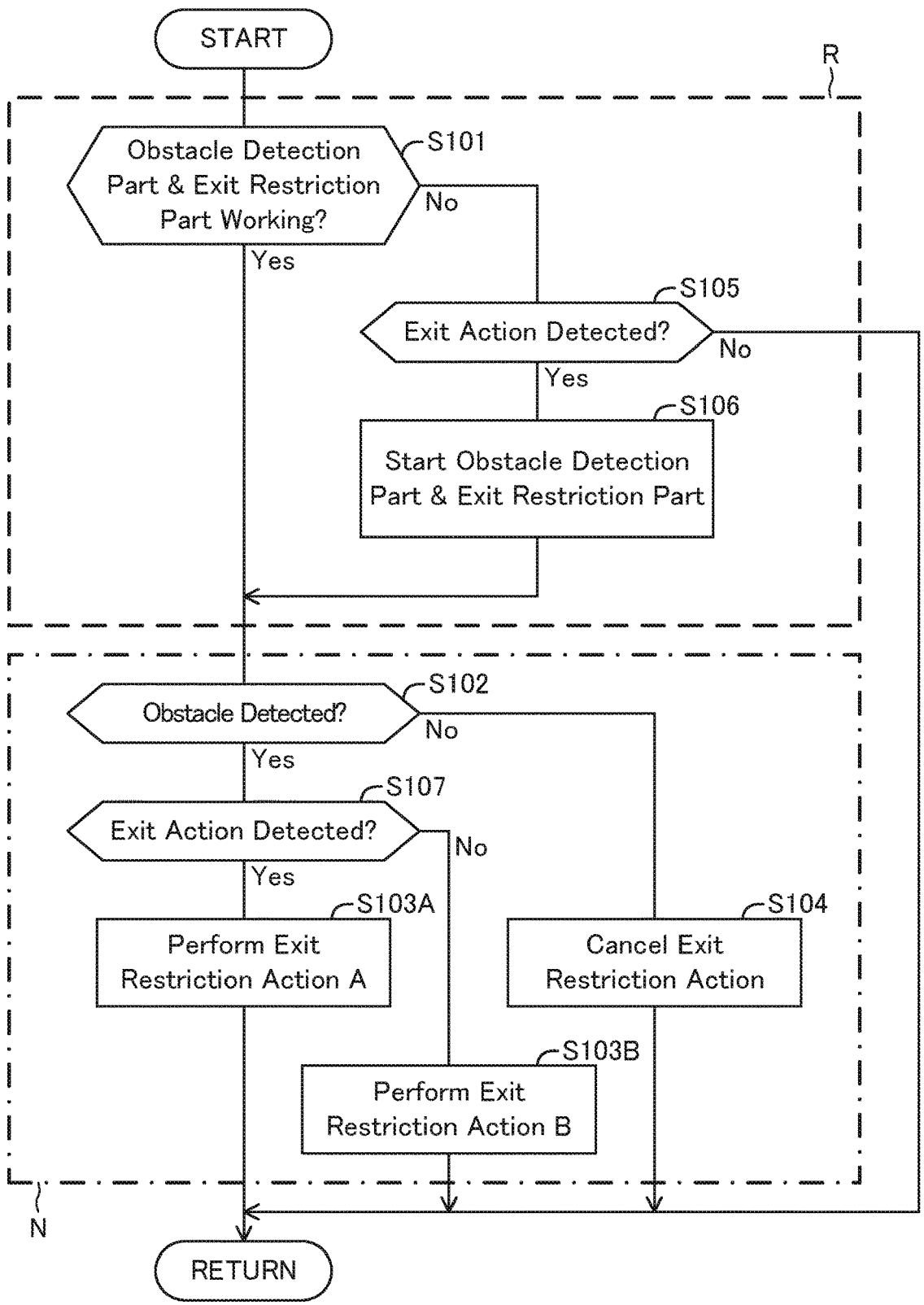
FIG. 5 is a flowchart for showing an example of an exit assist routine performed by the control part which the first apparatus according to Modification 1-2, comprises.

Since the first apparatus 100 comprises the exit action detection part 140, a different exit restriction action may be performed in the above-mentioned regular control (region N). For example, the sound, light, vibration and/or display (indication) as a warning may be changed depending on whether the exit action is detected or not. FIG. 5 is a flowchart for showing an example of the exit assist routine performed in the first apparatus according to this modification. In this example, Step S107, in which whether the exit action is detected by the exit action detection part 140 or not is judged, is added after Step S102, in which whether an obstacle which exists around the self-vehicle is detected or not is judged.

When the exit action is detected by the exit action detection part 140 in Step S107, the CPU judges as "Yes", progresses processing to the following Step S103A, and makes the exit restriction part 120 perform a certain exit restriction action A (for example, a warning action with a buzzer and vibration to a sheet near the door). On the other hand, when the exit action is not detected by the exit action detection part 140, the CPU judges as "No", progresses processing to the following Step S103B, and make the exit restriction part 120 perform an exit restriction action B different from the exit restriction action A (for example, warning action with a buzzer). Thus, in accordance with the first apparatus according to this modification, security when the occupant exits from the self-vehicle can be further improved by using properly the different exit restriction actions depending on whether the exit action is detected or not.

As with Step S105, Step S107 is a branch according to whether the exit action is detected by the exit action detection part 140 or not. Therefore, when Step S105 has already been performed before Step S107, it is not necessary to detect the existence of the exit action again in Step S107. For example, whether the exit action is detected or not may be judged by using a flag representing the detection result in Step S105, etc.

<Modification 1-3>

As mentioned above, one objective of the present invention is to provide a vehicle exit assist apparatus which can more certainly improve security when an occupant exits (gets out) while reducing unnecessary power consumption. Therefore, for example, a fact that the self-vehicle has stopped or a fact that speed of the self-vehicle is less than a predetermined threshold, etc. may be added to conditions (requirements) for the exit assist routine as mentioned above to be performed.

Second Embodiment

Hereafter, a vehicle exit assist apparatus according to a second embodiment of the present invention (which may be referred to as a "second apparatus" hereafter) will be explained, referring to drawings.

As mentioned above, in the first apparatus 100, even in a state where the obstacle detection part 110 and/or the exit restriction part 120 are not working, the restart control is performed by the control part 130 and the obstacle detection part 110 and the exit restriction part 120 are started up when the exit action is detected by the exit action detection part 140. However, the obstacle detection part 110 cannot always start a normal operation at the moment when being started up. For example, a certain amount of time may be taken for a detection means (for example, a radar, an ultrasonic sensor, an image sensor, etc.) constituting the obstacle detection part 110 to reach a state where it (the obstacle detection part 110) can operate normally.

During a period in which the obstacle detection part 110 has not reached the state where the obstacle detection part 110 can operate normally as mentioned above, there is a possibility that an obstacle cannot be normally detected even though the obstacle exists around the self-vehicle. Therefore, from a viewpoint of more certainly improving the security when an occupant exits from a self-vehicle, it is desirable to make the exit restriction part 120 perform the exit restriction action irrespective of whether an obstacle is detected by the obstacle detection part 110 during this period.

<Configuration>

Therefore, the second apparatus is the above-mentioned first apparatus, wherein the obstacle detection part is configured to transmit a predetermined first signal to the control part during a period in which the obstacle detection part is not in a state where the obstacle detection part can operate normally after starting-up. Furthermore, the control part is configured to perform the above-mentioned regular control during a period in which the first signal is not received and to perform compulsive control, during a period in which the first signal is received. The compulsive control is control, in which the exit restriction part is made to perform the exit restriction action irrespective of whether the obstacle is detected by the obstacle detection part or not.

Whether the obstacle detection part is in the state where it can operate normally or not can be judged by using a self-diagnosis function which the obstacle detection part comprises, etc., for example. The first signal can be transmitted to the control part through an on-vehicle network, such as CAN, for example. Moreover, the property of the first signal can be properly defined according to a protocol of the on-vehicle network mounted on the self-vehicle.

<Operation>

Figure 6:
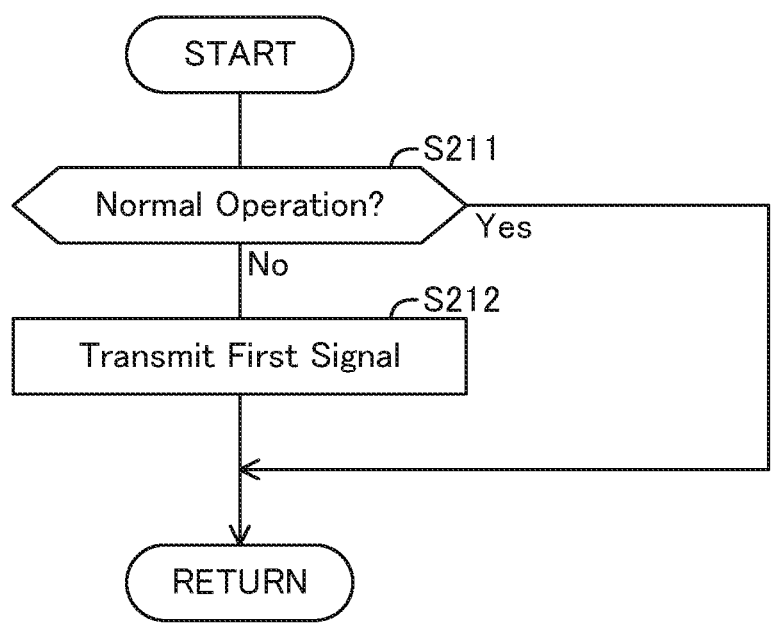
FIG. 6 is a flowchart for showing an example of an operating state notification routine performed after starting-up of an obstacle detection part which a vehicle exit assist apparatus according to a second embodiment of the present invention (second apparatus) comprises.

FIG. 6 is a flowchart for showing an example of an operating state notification routine performed after starting-up of the obstacle detection part 110 which the second apparatus comprises. Once the obstacle detection part 110 starts up and this routine is started, the CPU judges whether the obstacle detection part 110 is in the state where it (the obstacle detection part 110) can operate normally, in Step S211. When the obstacle detection part 110 in not in the state where it can operate normally, the CPU judges as "No" in Step S211, progresses processing to the following Step S212, and transmits the predetermined first signal to the control part 130. On the other hand, when the obstacle detection part 110 is in the state where it can operate normally, the CPU judges as "Yes" in Step S211, and once ends this routine.

The operating state notification routine as mentioned above is configured to be performed repeatedly at a predetermined interval by the CPU of the ECU which realizes the functions as the obstacle detection part 110. Therefore, the first signal is transmitted to the control part 130 during a period until the obstacle detection part 110 reaches the state where it can operate normally after being started up, and the transmission of the first signal to the control part 130 is stopped when the obstacle detection part 110 reaches the state where it can operate normally.

Figure 7:
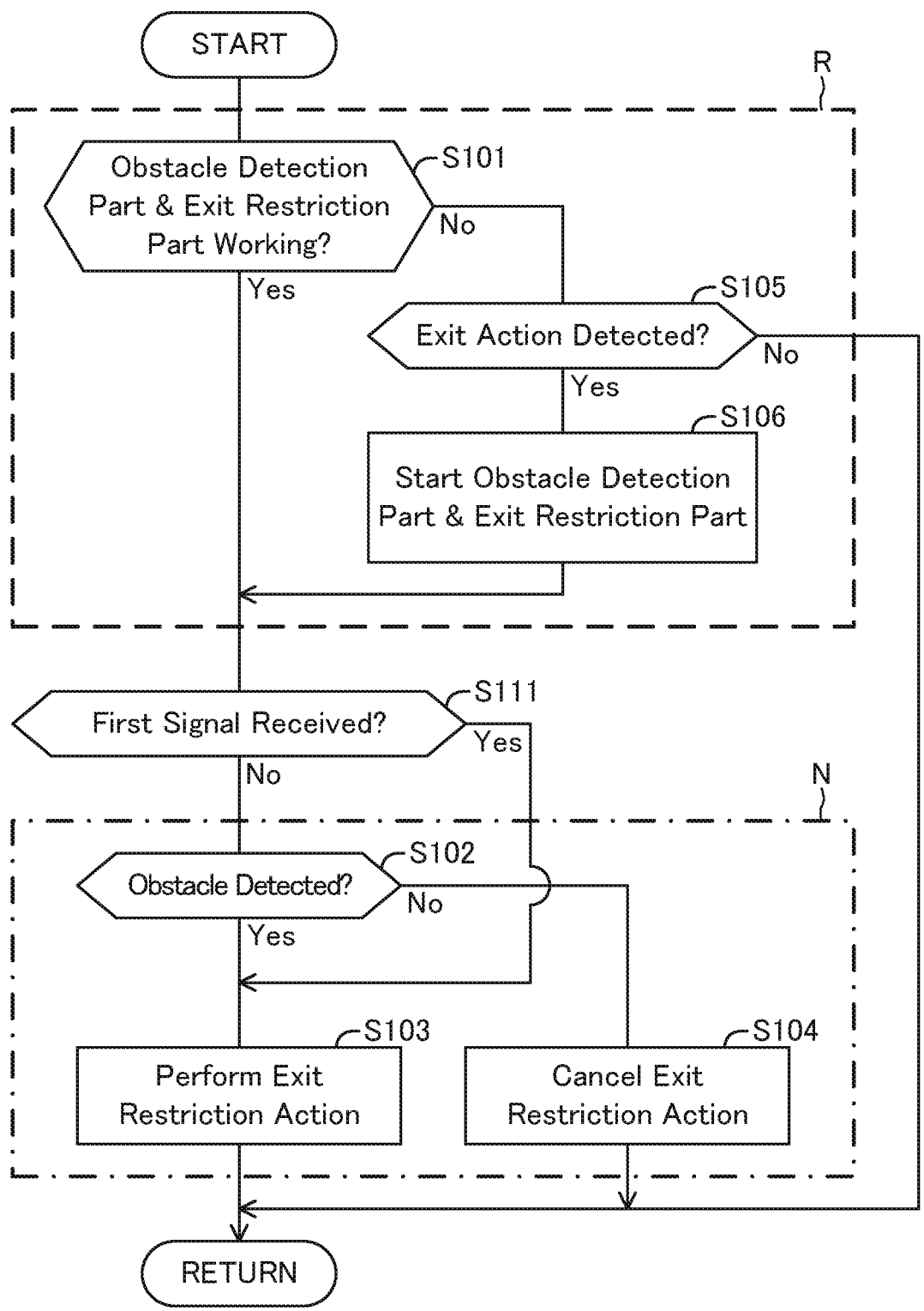
FIG. 7 is a flowchart for showing an example of an exit assist routine performed by a control part which the second apparatus comprises.

On the other hand, FIG. 7 is a flowchart for showing an example of the exit assist routine performed by the control part 130 which the second apparatus comprises. In this example, Step S111, in which whether the first signal is received from the obstacle detection part 110 is received or not is judged, is added just before Step S102, in which whether an obstacle which exists around the self-vehicle is detected or not is judged.

In Step S111, when the first signal is not received from the obstacle detection part 110, the CPU judges as "No" and progresses processing to the following Steps S102 to S104. Namely, when the obstacle detection part 110 is operating normally, the above-mentioned regular control (region N) is performed. On the other hand, when the first signal is received from the obstacle detection part 110, the CPU judges as "Yes", skips Step S102, and progresses processing to Step S103. Namely, when the obstacle detection part 110 is not operating normally, the CPU performs control, in which the exit restriction part 120 is made to perform the exit restriction action irrespective of whether the obstacle is detected by the obstacle detection part 110 or not (namely, the compulsive control). The sound, light, vibration and/or display, etc. as a warning may be different between the exit restriction action by the regular control and the exit restriction action by the compulsive control, for example.

<Effectiveness>

As mentioned above, in accordance with the second apparatus, the compulsive control is performed during the period in which the first signal is received. Namely, during the period in which the obstacle detection part 110 has not reached the state where the obstacle detection part 110 can operate normally, the exit restriction action is performed by the exit restriction part 120 irrespective of whether an obstacle is detected by the obstacle detection part 110 or not. Therefore, the possibility that the security when an occupant exits from the self-vehicle falls due to the fact that an obstacle cannot be normally detected even though the obstacle exists around the self-vehicle since the obstacle detection part 110 has not reached the state where it can operate normally can be reduced. Namely, the security when an occupant exits from the self-vehicle can be improved more certainly.

Third Embodiment

Hereafter, an according-to vehicle exit assist apparatus (it may refer with a "third apparatus" hereafter.) is explained to the third embodiment of the present invention, referring to drawing sheets.

As mentioned above, in the second apparatus, the first signal is transmitted from the obstacle detection part to the control part during the period in which the obstacle detection part is not in the state where it (the obstacle detection part) can operate normally, and the compulsive control is performed during the period in which the first signal is received. However, procedures for communicating whether the obstacle detection part is in the state where it (the obstacle detection part) can operate normally or not to the control part from the obstacle detection part are not limited to the above. For example, it is possible to communicate whether the obstacle detection part is in the state where it can operate normally or not to the control part from the obstacle detection part by using a second signal indicating that the obstacle detection part is operating normally, in place of the first signal indicating that the obstacle detection part is not operating normally as mentioned above.

<Configuration>

Therefore, a third apparatus is the above-mentioned first apparatus, wherein the obstacle detection part is configured to transmit a predetermined second signal to the control part during a period in which the obstacle detection part in a state where the obstacle detection part can operate normally after starting-up. Furthermore, the control part is configured to perform the regular control during a period in which the second signal is received and to perform the compulsive control during a period in which the second signal is not received. As mentioned above, the compulsive control is control, in which the exit restriction part is made to perform the exit restriction action irrespective of whether the obstacle is detected by the obstacle detection part or not.

As mentioned above, it is possible judge whether the obstacle detection part is in the state where the obstacle detection part can operate normally or not, by using the self-diagnosis function which the obstacle detection part comprises, etc., for example. As with the above-mentioned first signal, the second signal can be communicated to the control part through an on-vehicle network, such as CAN, for example, too. Moreover, the property of the second signal can be properly defined according to a protocol of the on-vehicle network mounted on the self-vehicle, too.

<Operation>

Figure 8:
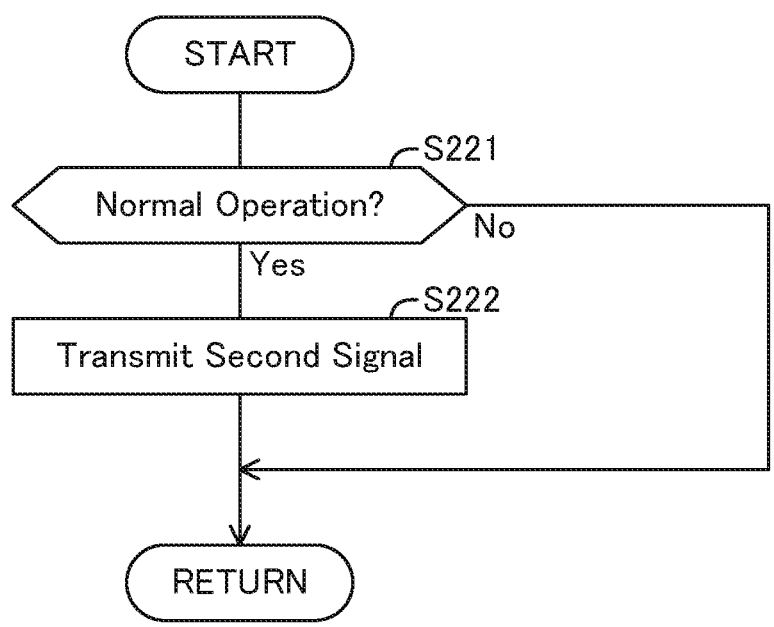
FIG. 8 is a flowchart for showing an example of the operating state notification routine performed after starting-up of an obstacle detection part which a vehicle exit assist apparatus according to a third embodiment of the present invention (third apparatus) comprises.

FIG. 8 is a flowchart for showing an example of the operating state notification routine performed after starting-up of the obstacle detection part which the vehicle exit assist apparatus according to third apparatus comprises. Once the obstacle detection part 110 starts and this routine is started, the CPU judges whether the obstacle detection part 110 is in a state where it (the obstacle detection part 110) can operate normally, in Step S221. When the obstacle detection part 110 is in the state where it can operate normally, the CPU judges as "Yes" in Step S221, progresses processing to the following Step S222, and transmits the predetermined second signal to the control part 130. On the other hand, when the obstacle detection part 110 in not in the state where it can operate normally, the CPU judges as "No" in Step S221, and once ends this routine.

The operating state notification routine as mentioned above is configured to be performed repeatedly at a predetermined interval by the CPU of the ECU which realizes the function as the obstacle detection part 110. Therefore, the second signal is not transmitted to the control part 130 during a period until the obstacle detection part 110 reaches the state where it can operate normally after starting-up, and the second signal comes to be transmitted to the control part 130 when the obstacle detection part 110 reaches the state where it can operate normally.

Figure 9:
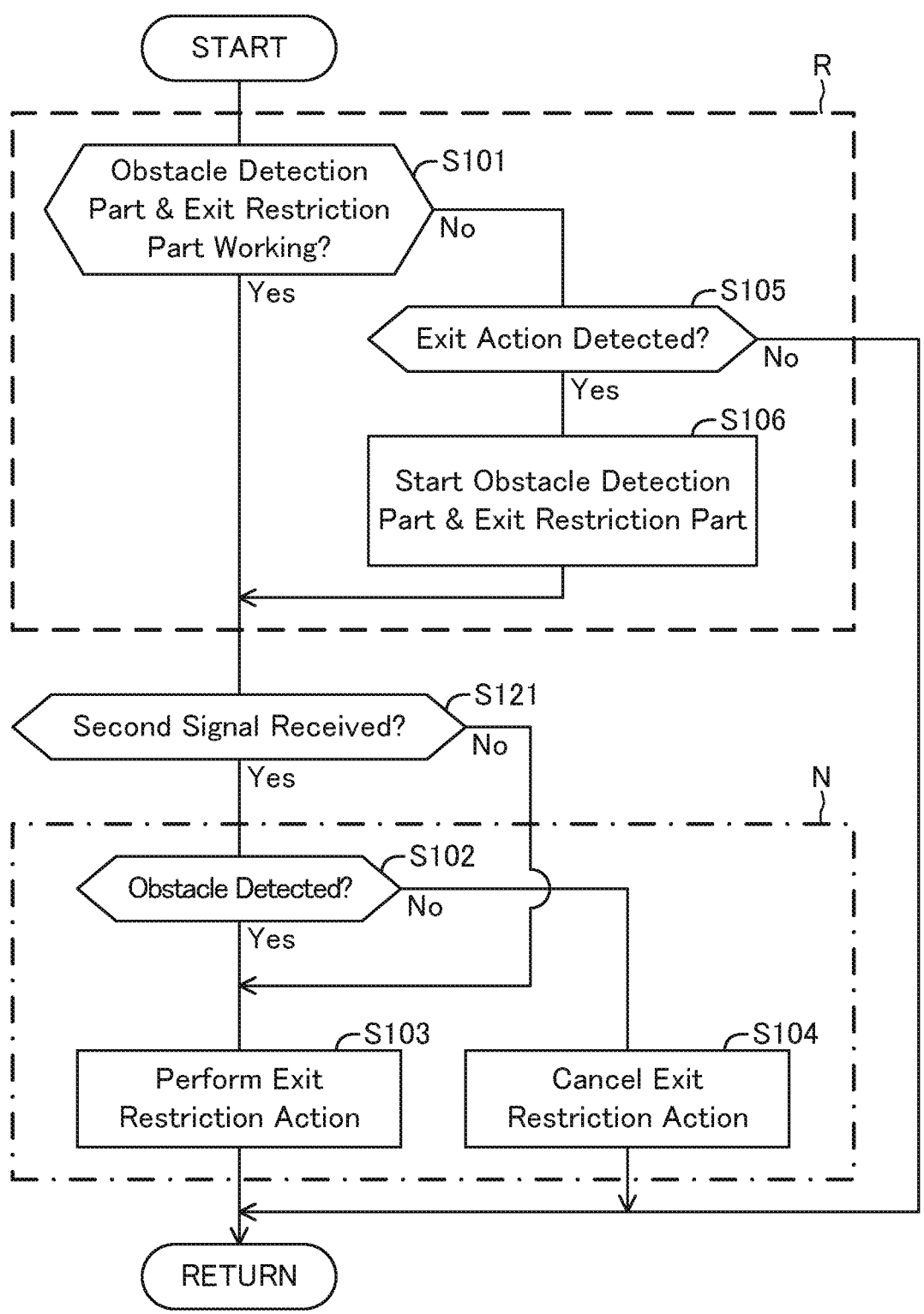
FIG. 9 is a flowchart for showing an example of the exit assist routine performed in the control part which a third apparatus comprises.

On the other hand, FIG. 9 is a flowchart for showing an example of the exit assist routine performed in the control part 130 which the third apparatus comprises. In this example, Step S121, in which whether the second signal is received from the obstacle detection part 110 or not is judged, is added just before Step S102, in which whether the obstacle which exists around the self-vehicle is detected or not is judged.

In Step S121, when the second signal is received from the obstacle detection part 110, the CPU judges as "Yes" and progresses processing to the following Steps S102 to S104. Namely, when the obstacle detection part 110 is operating normally, the above-mentioned regular control (region N) is performed. On the other hand, when the first signal is not received from the obstacle detection part 110, the CPU judges as "No", skips Step S102, and progresses processing to Step S103. Namely, when the obstacle detection part 110 is not operating normally, the CPU performs control in which the exit restriction part 120 is made to perform the exit restriction action irrespective of whether an obstacle is detected by the obstacle detection part 110 or not (namely, the compulsive control). The sound, light, vibration and/or display, etc. as a warning may be different between the exit restriction action by the regular control and the exit restriction action by the compulsive control, for example.

<Effectiveness>

As mentioned above, in accordance with the third apparatus, the compulsive control is performed during the period in which the second signal is not received. Namely, during the period in which the obstacle detection part 110 has not reached the state where the obstacle detection part 110 can operate normally, the exit restriction action is performed by the exit restriction part 120 irrespective of whether an obstacle is detected by the obstacle detection part 110 or not. Therefore, the possibility that the security when an occupant exits from the self-vehicle falls due to the fact that an obstacle cannot be normally detected even though the obstacle exists around the self-vehicle since the obstacle detection part 110 has not reached the state where it can operate normally can be reduced. Namely, the security when an occupant exits from the self-vehicle can be improved more certainly.

By the way, a situation where a signal cannot be normally transmitted and received between the obstacle detection part 110 and the control part 130 due to some abnormality (for example, communication failure in the on-vehicle networks, such as CAN, etc.) is also assumed. In such a case, in the second apparatus which performs the compulsive control on condition that the first signal indicating that the obstacle detection part 110 is not operating normally is received as mentioned above, there is a possibility that the first signal cannot be received even though an obstacle detection part is not operating normally and the obstacle cannot be normally detected.

However, in the third apparatus, the compulsive control is performed during the period in which the second signal is not received as mentioned above. Therefore, the compulsive control is performed even when transmission of the second signal by the obstacle detection part 110 and/or reception of the second signal by the control part 130 becomes impossible due to some abnormality as mentioned above. Namely, in accordance with the third apparatus, the security when an occupant exits from the self-vehicle can be improved further more certainly, as compared with the second apparatus which performs the compulsive control on condition that the first signal indicating that the obstacle detection part is not operating normally is received as mentioned above.

Fourth Embodiment

Hereafter, a vehicle exit assist apparatus according to a fourth embodiment of the present invention (which may be referred to as a "fourth apparatus" hereafter) will be explained, referring to drawings.

As mentioned above, in the second apparatus, the first signal is transmitted from the obstacle detection part to the control part during the period in which the obstacle detection part is not in the state where it (the obstacle detection part) can operate normally, and the compulsive control is performed during the period in which the first signal is received. On the other hand, in the third apparatus, the second signal is transmitted from the obstacle detection part to the control part during the period in which the obstacle detection part is in the state where it can operate normally, and the compulsive control is performed during the period in which the second signal is not received.

However, procedures for communicating whether the obstacle detection part is in the state where it (the obstacle detection part) can operate normally or not to the control part from the obstacle detection part are not limited to the above. For example, it is possible to communicate whether the obstacle detection part is in the state where it can operate normally or not to the control part from the obstacle detection part by using the second signal indicating that the obstacle detection part is operating normally, in addition to the first signal indicating that the obstacle detection part is not operating normally as mentioned above.

<Configuration>

Therefore, the fourth apparatus is the above-mentioned first apparatus, wherein the obstacle detection part is configured to transmit a predetermined first signal to the control part during a period in which the obstacle detection part is not in a state where the obstacle detection part can operate normally after starting-up, and to transmit a predetermined second signal to the control part during a period in which the obstacle detection part is in a state where the obstacle detection part can operate normally after starting-up. Furthermore, the control part is configured to perform the regular control during a period in which the second signal is received and to perform compulsive control during a period in which the first signal is received. The compulsive control is control, in which the exit restriction part is made to perform the exit restriction action irrespective of whether the obstacle is detected by the obstacle detection part or not.

As mentioned above, it is possible judge whether the obstacle detection part is in the state where the obstacle detection part can operate normally or not, by using the self-diagnosis function which the obstacle detection part comprises, etc., for example. The first signal and the second signal can be communicated to the control part through an on-vehicle network, such as CAN, for example. Moreover, the properties of the first signal and the second signal can be properly defined according to a protocol of the on-vehicle network mounted on the self-vehicle.

<Operation>

Figure 10:
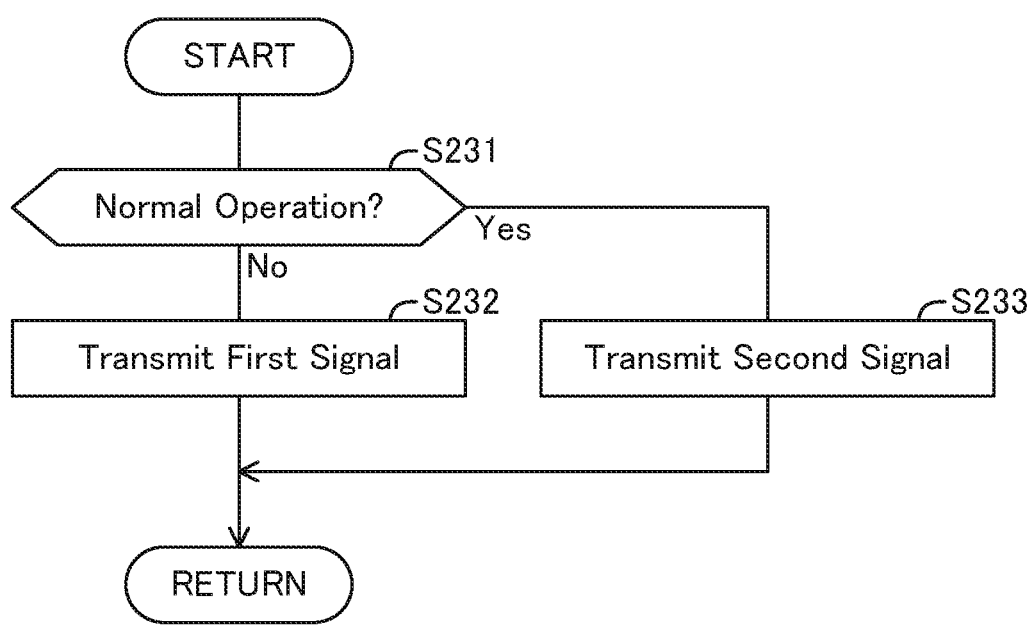
FIG. 10 is a flowchart for showing an example of the operating state notification routine performed after starting-up of an obstacle detection part which a vehicle exit assist apparatus according to a fourth embodiment of the present invention (fourth apparatus) comprises.

FIG. 10 is a flowchart for showing an example of the operating state notification routine performed after starting-up of the obstacle detection part 110 which the forth apparatus comprises. Once the obstacle detection part 110 starts up and this routine is started, the CPU judges whether the obstacle detection part 110 is in the state where the obstacle detection part 110 can operate normally, in Step S231. When the obstacle detection part 110 is not in the state where it can operate normally, the CPU judges as "No" in Step S231, progresses processing to the following Step S322, transmits the predetermined first signal to the control part 130, and once ends this routine. On the other hand, when the obstacle detection part 110 is in the state where it can operate normally, the CPU judges as "Yes" in Step S231, progresses processing to the following Step S233, transmits the predetermined second signal to the control part 130, and once ends this routine.

The operating state notification routine as mentioned above is configured to be performed repeatedly at a predetermined interval by the CPU of the ECU which realizes the function as the obstacle detection part 110. Therefore, the first signal is transmitted to the control part 130 during a period until the obstacle detection part 110 reaches the state where it can operate normally after starting-up, and the second signal comes to be transmitted to the control part 130 when the obstacle detection part 110 reaches the state where it can operate normally.

Figure 11:
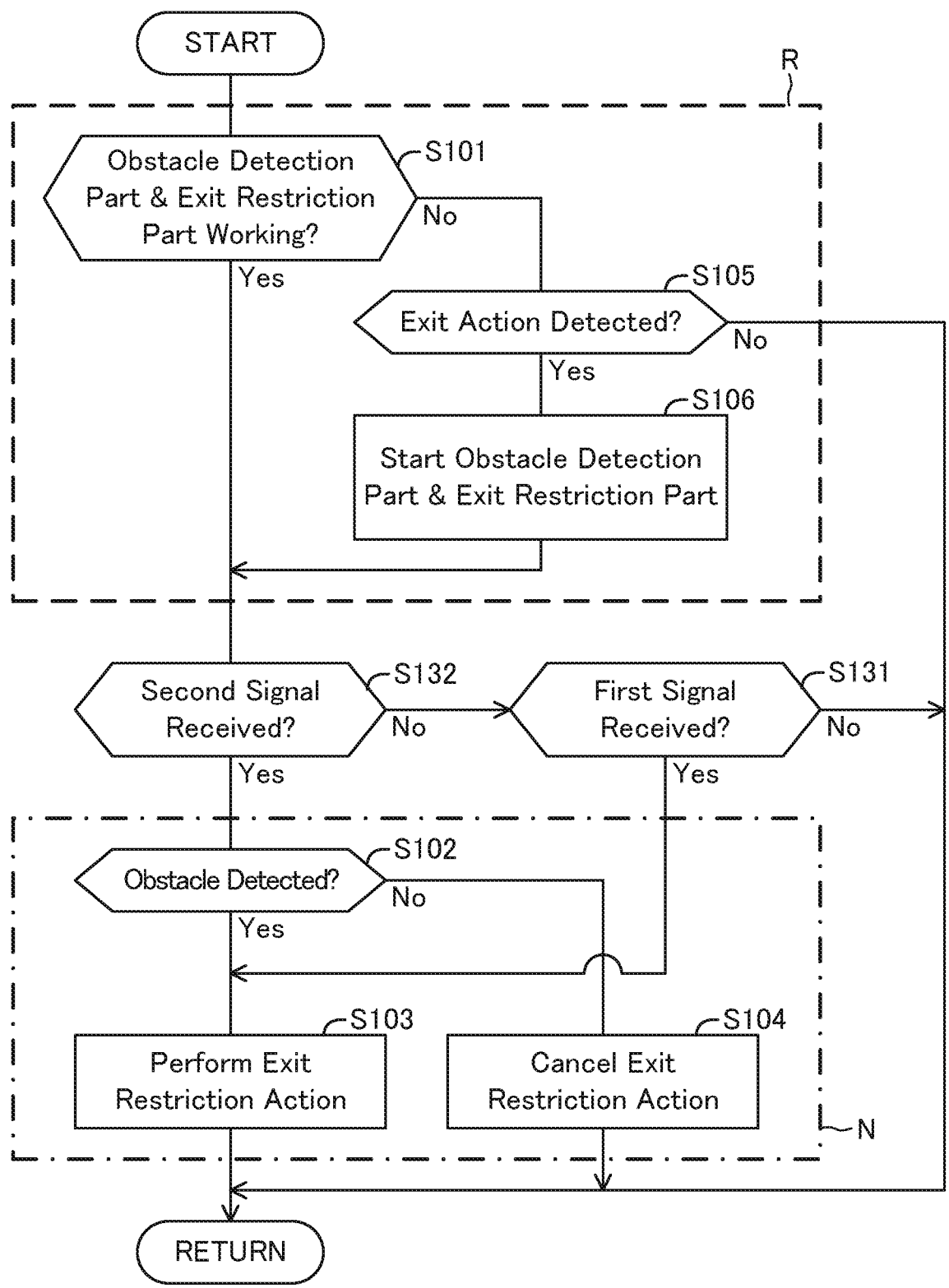
FIG. 11 is a flowchart for showing an example of an exit assist routine performed by a control part which the fourth apparatus comprises.

On the other hand, FIG. 11 is a flowchart for showing an example of the exit assist routine performed by the control part 130 which the fourth apparatus comprises. In this example, Step S131, in which whether the first signal is received from the obstacle detection part 110 or not is judged, and Step S132, in which whether the second signal is received from the obstacle detection part 110 or not is judged, are added just before Step S102, in which whether the obstacle which exists around the self-vehicle is detected or not is judged.

In Step S132, when the second signal is received from the obstacle detection part 110, the CPU judges as "Yes" and progresses processing to the following Steps S102 to S104. Namely, when the obstacle detection part 110 is operating normally, the above-mentioned regular control (region N) is performed. On the other hand, when the second signal is not received from the obstacle detection part 110, the CPU judges as "No" and progresses processing to the following Steps S131.

In Step S131, when the first signal is received from the obstacle detection part 110, the CPU judges as "Yes", skips Step S102, and progresses processing to Step S103. Namely, when the obstacle detection part 110 is not operating normally, the CPU performs control in which the exit restriction part 120 is made to perform the exit restriction action irrespective of whether an obstacle is detected by the obstacle detection part 110 or not (namely, the compulsive control). The sound, light, vibration and/or display, etc. as a warning may be different between the exit restriction action by the regular control and the exit restriction action by the compulsive control, for example. In Step S131, when the first signal is not received from the obstacle detection part 110, the CPU judges as "No" and once ends this routine. Step S131, in which whether the first signal is received or not is judged, may be configured to be performed before Step S132, in which whether the second signal is received from the obstacle detection part 110 or not is judged, in contrary to the example shown in FIG. 16.

<Effectiveness>

As mentioned above, in the fourth apparatus, the regular control is performed during the period in which the second signal indicating that the obstacle detection part 110 is operating normally is received, and the compulsive control is performed during the period in which the first signal indicating that the obstacle detection part 110 is not operating normally is received. Therefore, in accordance with the fourth apparatus, the execution of the exit restriction action by the exit restriction part 120 can be controlled more certainly in response to whether the obstacle detection part 110 is operating normally or not. Namely, security when an occupant exits from the self-vehicle can be improved more certainly.

Modification 4-1

By the way, in the above-mentioned fourth apparatus, the regular control is performed during the period in which the second signal indicating that the obstacle detection part 110 is operating normally is received, and the compulsive control is performed during the period in which the first signal indicating that the obstacle detection part 110 is not operating normally is received. When neither the first signal nor the second signal is received, the exit assist routine is once ended without performing any particular processing, in the example shown in FIG. 11.

However, as mentioned above, the first signal is a signal which shows that the obstacle detection part 110 is not operating normally, and the second signal is a signal which shows that the obstacle detection part 110 is operating normally. Therefore, when the control part 130 can receive neither the first signal nor the second signal from the obstacle detection part 110, there is a possibility that some abnormality (for example, a trouble in the obstacle detection part 110 and communication failure in the on-vehicle networks, such as CAN, etc.) may have arisen in the fourth apparatus. From a viewpoint of ensuring the safety when the occupant exits, it is not necessarily desirable to end the exit assist routine without performing any particular processing in such a case.

Therefore, in the fourth apparatus according to Modification 4-1, the control part is configured to perform the compulsive control during a period in which neither the first signal nor the second signal is received.

Figure 12:
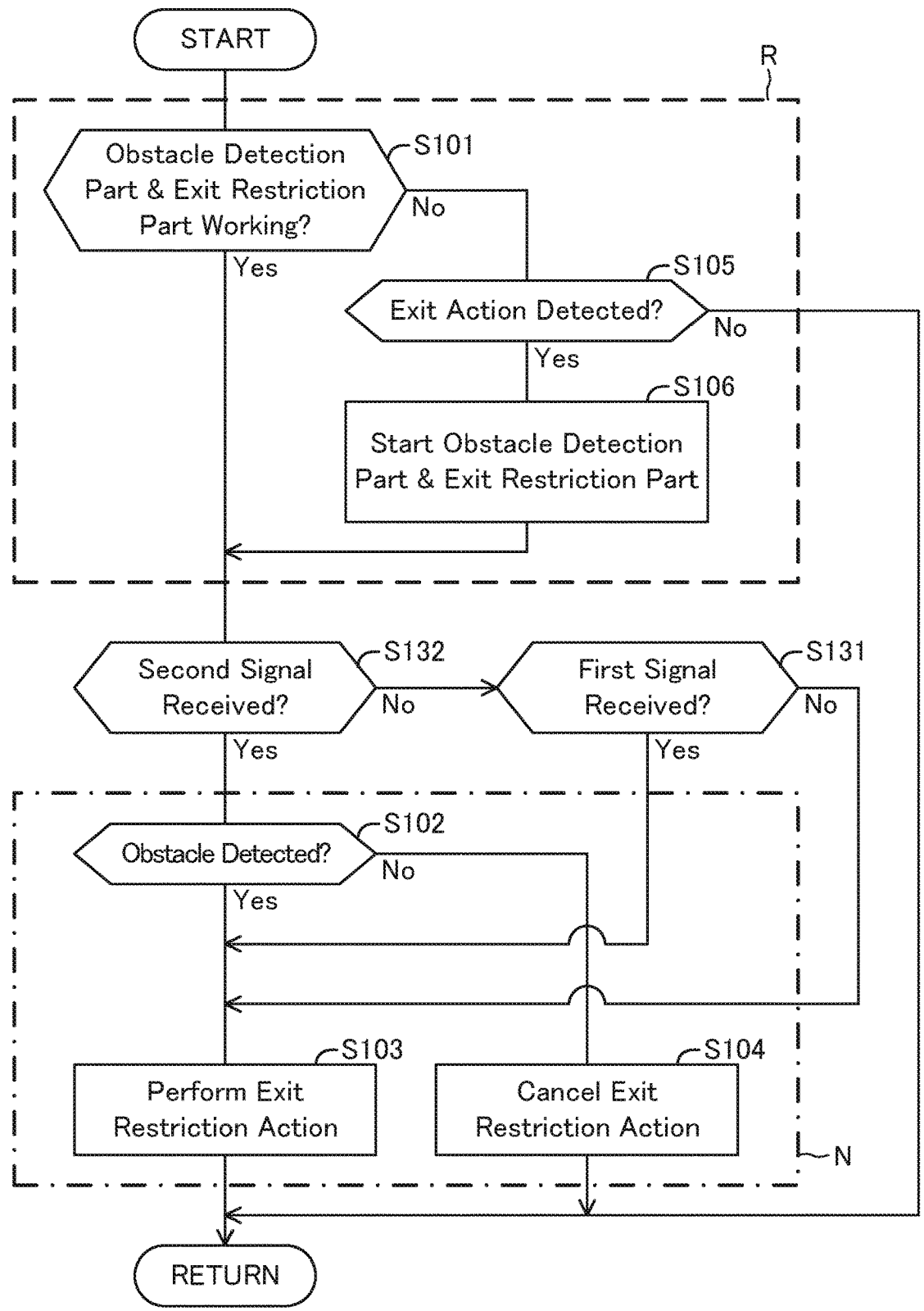
FIG. 12 is a flowchart for showing an example of an exit assist routine performed by a control part which the fourth apparatus according to Modification 4-1 comprises.

FIG. 12 is a flowchart for showing an example of the exit assist routine performed by the control part which the fourth apparatus according to Modification 4-1 comprises. In the above-mentioned flowchart shown in FIG. 11, when the first signal is not received from the obstacle detection part 110 in Step S131, the CPU judges as "No" and once ends the routine. On the other hand, in the flowchart shown in FIG. 12, when the first signal is not received from the obstacle detection part 110 in Step S131, the CPU judges as "No", skips Step S102, and progresses processing to Step S103. Except for this point, the exit assist routine expressed by the flowchart shown in FIG. 12 is the same as the exit assist routine expressed by the flowchart shown in FIG. 11.

As mentioned above, in the fourth apparatus according to Modification 4-1, the control in which the exit restriction part 120 is made to perform the exit restriction action irrespective of whether an obstacle is detected by the obstacle detection part 110 or not (namely, the compulsive control) is performed also when the control part 130 can receive neither the first signal nor the second signal from the obstacle detection part 110. Therefore, even when the control part 130 can receive neither the first signal nor the second signal from the obstacle detection part 110 due to some abnormality in the fourth apparatus, attention of the occupant in the self-vehicle can be called, and the safety when exiting from the self-vehicle can be ensured.

Modification 4-2

By the way, as mentioned above, the sound, light, vibration and/or display, etc. as a warning may be different between the exit restriction action by the regular control and the exit restriction action by the compulsive control, for example. Moreover, in the fourth apparatus according to Modification 4-1, the sound, light, vibration and/or display, etc. as a warning may be different between the exit restriction action by the compulsive control performed during the period in which the first signal is received (Step S131: Yes) and the exit restriction action by the compulsive control performed during the period in which neither the first signal nor the second signal is received (Step S131: No), for example.

Especially, when the control part 130 can receive neither the first signal nor the second signal from the obstacle detection part 110, there is a possibility that some abnormality (for example, a trouble in the obstacle detection part 110 and communication failure in the on-vehicle networks, such as CAN, etc.) may have arisen in the fourth apparatus.

Therefore, the fourth apparatus according to Modification 4-2 further comprises an abnormal detection warning part. The abnormal detection warning part is configured to perform an abnormal detection warning action that is an action to issue an abnormal detection warning. The abnormal detection warning is a warning for showing that the obstacle detection part is not operating normally. As specific examples of the abnormal detection warning, the same examples as those of the "warning on a door which the self-vehicle comprises" issued by the above-mentioned warning action can be mentioned. However, since the objective of the abnormal detection warning is to inform the occupant in the self-vehicle that the obstacle detection part is not operating normally, a warning distinguishable from the "warning on the door which the self-vehicle comprises" should be chosen as the abnormal detection warning.

Furthermore, the control part is configured to perform and abnormality warning control that is control, in which the abnormal detection warning part is made to perform the abnormal detection warning action, in addition to the compulsive control, during a period in which neither the first signal nor the second signal is received. Since a warning distinguishable from the "warning on the door which the self-vehicle comprises" is chosen as the abnormal detection warning as mentioned above, even in a case where the above-mentioned warning action is chosen as the exit restriction action by the compulsive control, the occupant in the self-vehicle can distinguish and recognize the exit restriction action and the abnormal detection warning action.

Figure 13:
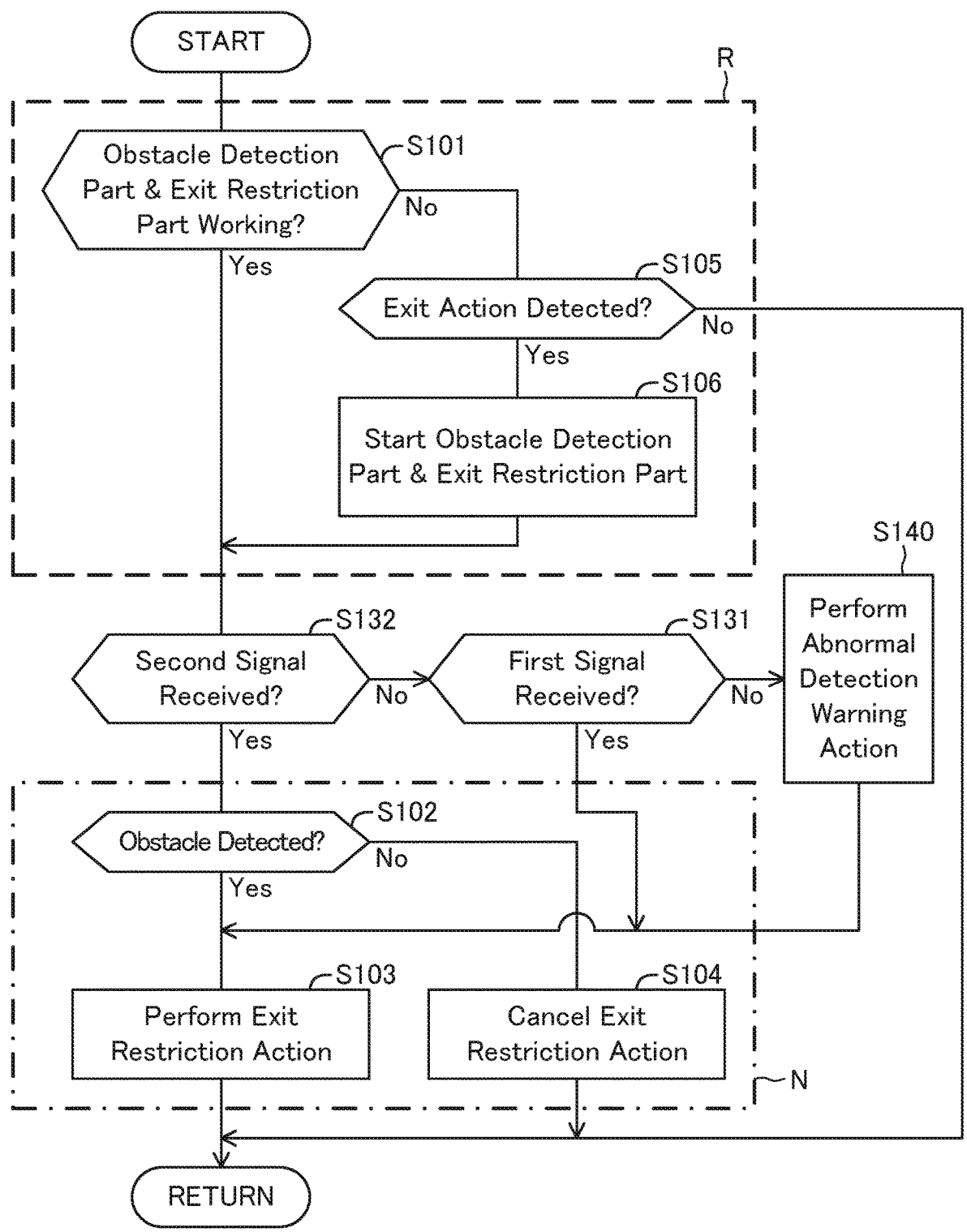
FIG. 13 is a flowchart for showing an example of an exit assist routine performed by a control part which the fourth apparatus according to Modification 4-2 comprises.

FIG. 13 is a flowchart for showing an example of the exit assist routine performed by the control part which the fourth apparatus according to Modification 4-2 comprises. In this example, Step S140, in which the abnormal detection warning part is made to perform the abnormal detection warning action, intervenes between Step S131, in which whether the first signal is received from the obstacle detection part 110 or not is judged, and Step S103, in which the exit restriction part 120 is made to perform the exit restriction action. Except for this point, the exit assist routine expressed by the flowchart shown in FIG. 13 is the same as the exit assist routine expressed by the flowchart shown in FIG. 12.

As mentioned above, in the fourth apparatus n according to Modification 4-2, when the control part 130 can receive neither the first signal nor the second signal from the obstacle detection part 110, the control in which the abnormal detection warning part is made to perform the abnormal detection warning action (namely, abnormality warning control) is performed, in addition to the control in which the exit restriction part 120 is made to perform the exit restriction action irrespective of whether an obstacle is detected by the obstacle detection part 110 (namely, the compulsive control). Therefore, when the control part 130 can receive neither the first signal nor the second signal from the obstacle detection part 110 due to some abnormality in the fourth apparatus, the occupant can be informed that there is a possibility that some abnormality (for example, a trouble in the obstacle detection part 110 and communication failure in the on-vehicle networks, such as CAN, etc.) may have arisen in the fourth apparatus while ensuring the safety when the occupant exits from the self-vehicle.

Fifth Embodiment

Hereafter, a vehicle exit assist apparatus according to a fifth embodiment of the present invention (which may referred to as a "fifth apparatus" hereafter) will be explained, referring to drawings.

As mentioned above, in the vehicle exit assist apparatuses according to the second embodiment to the fourth embodiment of the present invention (the second apparatus to the fourth apparatus), during the period in which the obstacle detection part 110 is not in the state where the obstacle detection part 110 can operate normally, the control in which the exit restriction part is made to perform the exit restriction action (the compulsive control) is performed irrespective of whether an obstacle is detected by the obstacle detection part or not. Typically, the period must be in agreement with the period until the detection means constituting the obstacle detection part 110 (for example, a radar, an ultrasonic sensor and an image sensor, etc.) after the above-mentioned restart control is performed by the control part 130 and the obstacle detection part 110 and the exit restriction part 120 are started (for example, less than 1 second).

However, actually, the state where the obstacle detection part 110 may be unable to reach the state where it can operate normally due to some abnormality even though time equivalent to the length of the above-mentioned period has passed. As specific examples of such abnormality, contamination and trouble of the detection means which the obstacle detection part 110 comprises (for example, a radar, an ultrasonic sensor, an image sensor, etc.) and poor communication due to disconnection and a contact failure in the on-vehicle network, such as CAN, etc., for example.

When the state where the obstacle detection part 110 cannot reach the state where it can operate normally due to some abnormality as mentioned above even though a predetermined period has passed, the compulsive control will be performed for a long period of time in the second apparatus to the fourth apparatus. As a result, there is a possibility that exit assist is performed to give discomfort to the occupant and/or consume unnecessary electric power.
<Configuration>

Therefore, the fifth apparatus is any one of the above-mentioned second to fourth apparatuses, wherein the control part is configured to cancel the exit restriction action when the length of a period, for which the compulsive control is being continuously performed, is longer than a predetermined threshold value. The predetermined threshold can be set based on a period of time required for reaching a state where the detection means constituting the obstacle detection part 110 (for example, a radar, an ultrasonic sensor, an image sensor, etc.) can operate normally, etc. after the obstacle detection part 110 and the exit restriction part 120 are started (for example, less than 1 second).

<Operation>

Figure 14:
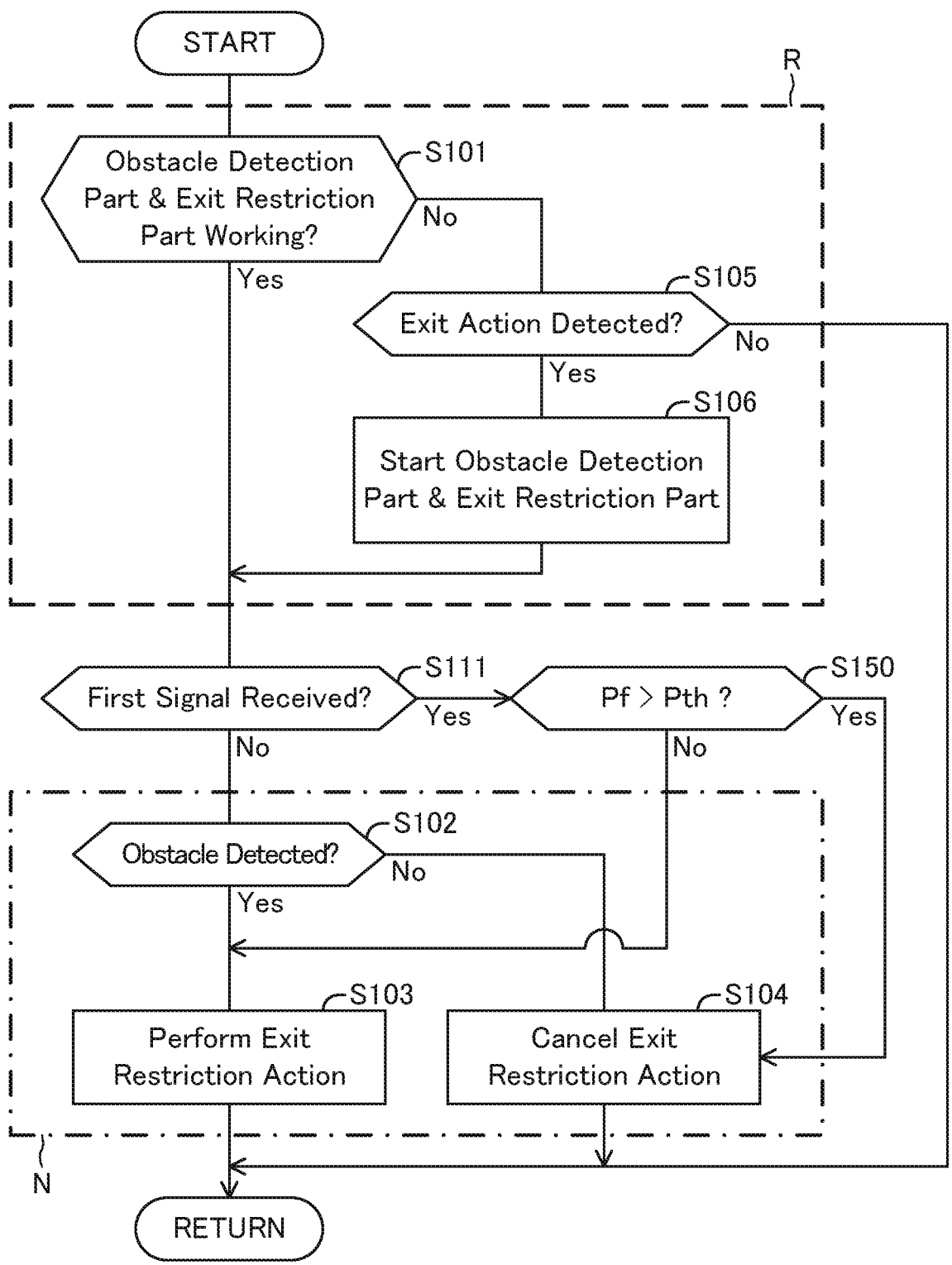
FIG. 14 is a flowchart for showing an example of an exit assist routine performed by a control part which a vehicle exit assist apparatus according to a fifth embodiment of the present invention (the fifth apparatus) comprises.

FIG. 14 is a flowchart for showing an example of an exit assist routine performed by the control part 130 which the fifth apparatus comprises. In the fifth apparatus shown in this example, this embodiment is applied to the second apparatus which performs the exit assist routine shown in FIG. 7. Specifically, Step S150, in which whether the length Pf of a period (compulsive control period) in which the exit restriction action by the compulsive control is performed continuously (the length of a period in which the state where the first signal is received continuously is continuing, in this example) is longer than a predetermined threshold Pth or not is judged, intervenes between Step S111, in which whether the first signal is received from the obstacle detection part 110 or not is judged, and Step S103, in which the exit restriction part 120 is made to perform the exit restriction action. Except for this point, the exit assist routine expressed by the flowchart shown in FIG. 14 is the same as the exit assist routine expressed by the flowchart shown in FIG. 7.

When the length Pf of the compulsive control period is the threshold Pth or less, the CPU judges as "No" in Step S150 and progresses processing to the following Step S103. Namely, the CPU performs the control, in which the exit restriction part 120 is made to perform the exit restriction action irrespective of whether an obstacle is detected by the obstacle detection part 110 or not (namely, the compulsive control), and once ends this routine. On the other hand, when the length Pf of the compulsive control period is longer than the threshold Pth, the CPU judges as "Yes" in Step S150, progresses processing to the following Step S104, cancels the exit restriction action when the exit restriction action is being performed, and once ends this routine.

Figure 15:
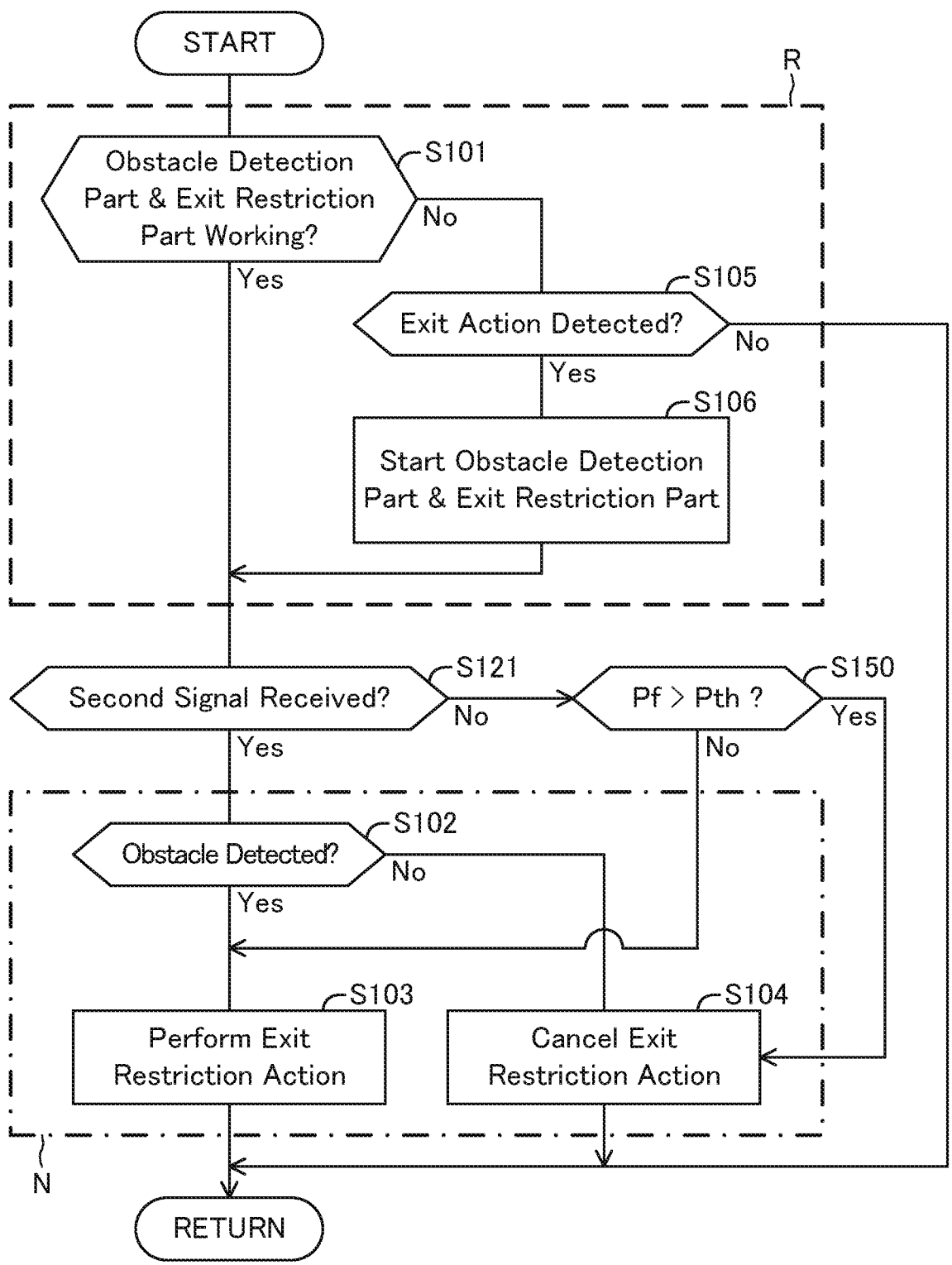
FIG. 15 is a flowchart for showing another example of the exit assist routine performed by the control part which the fifth apparatus comprises.

Next, FIG. 15 is a flowchart for showing another example of the exit assist routine performed by the control part 130 which the fifth apparatus comprises. In the fifth apparatus shown in this example, this embodiment is applied to the third apparatus which performs the exit assist routine shown in FIG. 9. Specifically, Step S150, in which whether the length Pf of the compulsive control period (the length of a period in which the state where the second signal is not received is continuing, in this example) is longer than the predetermined threshold Pth or not is judged, intervenes between Step S121, in which whether the second signal is received from the obstacle detection part 110 or not is judged, and Step S103, in which the exit restriction part 120 is made to perform the exit restriction action. Except for this point, the exit assist routine expressed by the flowchart shown in FIG. 15 is the same as the exit assist routine expressed by the flowchart shown in FIG. 9.

When the length Pf of the compulsive control period is the threshold Pth or less, the CPU judges as "No" in Step S150 and progresses processing to the following Step S103. Namely, the CPU performs the control, in which the exit restriction part 120 is made to perform the exit restriction action irrespective of whether an obstacle is detected by the obstacle detection part 110 or not, and once ends this routine. On the other hand, when the length Pf of the compulsive control period is longer than the threshold Pth, the CPU judges as "Yes" in Step S150, progresses processing to the following Step S104, cancels the exit restriction action when it is being performed, and once ends this routine.

Figure 16:
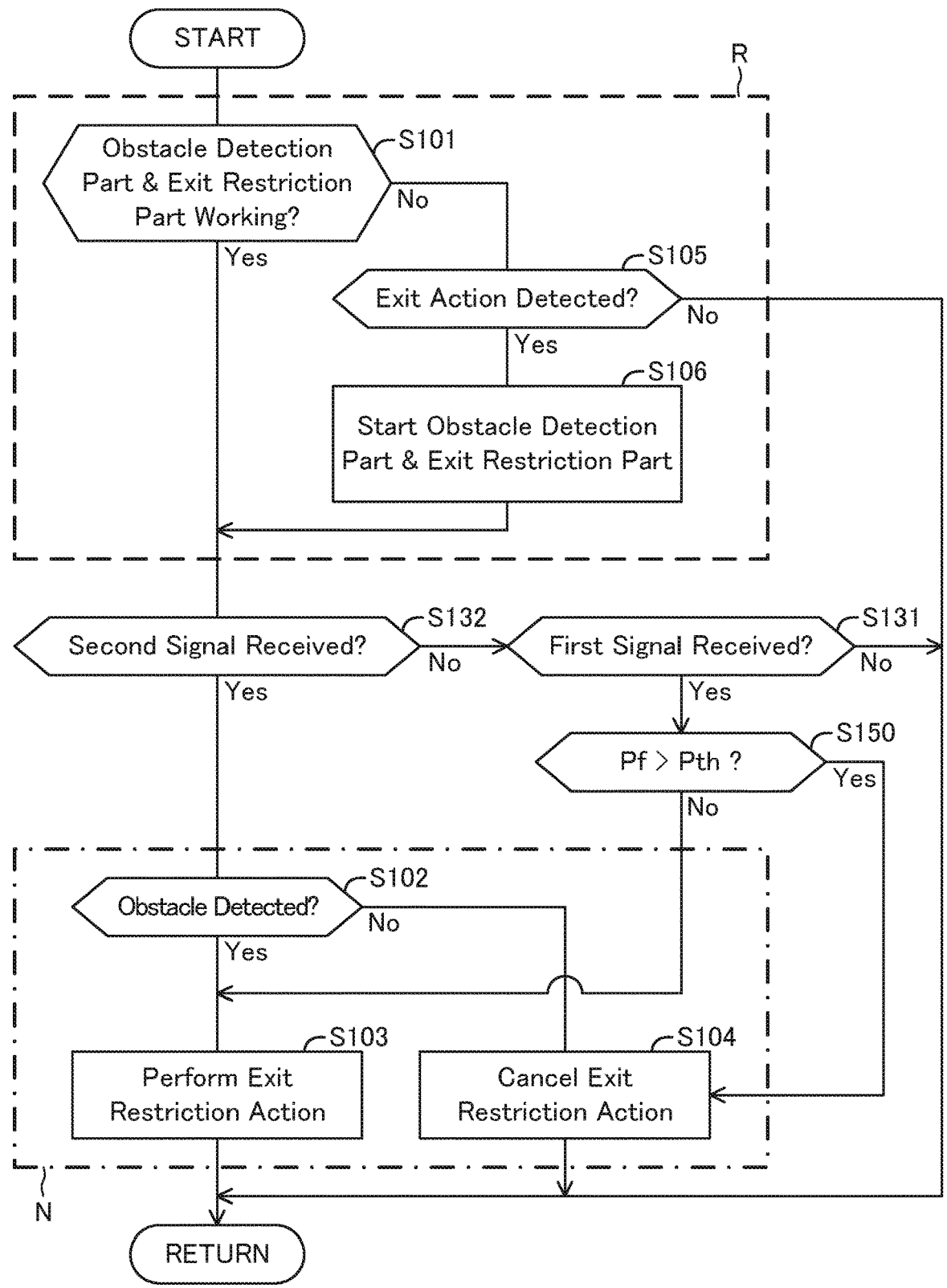
FIG. 16 is a flowchart for showing further another example of the exit assist routine performed by the control part which the fifth apparatus comprises.

Next, FIG. 16 is a flowchart for showing further another example of the exit assist routine performed by the control part 130 which the fifth apparatus comprises. In the fifth apparatus shown in this example, this embodiment is applied to the fourth apparatus which performs the exit assist routine shown in FIG. 11. Specifically, Step S150, in which whether the length Pf of the compulsive control period (the length of a period in which the state where the first signal is received is continuing, in this example) is longer than the predetermined threshold Pth or not is judged, intervenes between Step S131, in which whether the first signal is received from the obstacle detection part 110 or not is judged, and Step S103, in which the exit restriction part 120 is made to perform the exit restriction action. Except for this point, the exit assist routine expressed by the flowchart shown in FIG. 16 is the same as the exit assist routine expressed by the flowchart shown in FIG. 11.

When the length Pf of the compulsive control period is the threshold Pth or less, the CPU judges as "No" in Step S150 and progresses processing to the following Step S103. Namely, the CPU performs the control, in which the exit restriction part 120 is made to perform the exit restriction action irrespective of whether an obstacle is detected by the obstacle detection part 110 (namely, the compulsive control), and once ends this routine. On the other hand, when the length Pf of the compulsive control period is longer than the threshold Pth, the CPU judges as "Yes" in Step S150, progresses processing the following Step S104, and cancels the exit restriction action is performed when it is being performed, and once ends this routine.

<Effectiveness>

As mentioned above, in the fifth apparatus, the control part 130 is configured to cancel the exit restriction action when the length Pf of the compulsive control period becomes longer than the predetermined threshold Pth. Therefore, in accordance with the fifth apparatus, a possibility that the exit restriction action by the compulsive control is performed for an excessively long period to give discomfort to the occupant and/or consume unnecessary electric power can be reduced.

In the fifth apparatus exemplified in FIG. 14 to FIG. 16, as mentioned above, when the obstacle detection part 110 is not in the state where the obstacle detection part 110 can operate normally (Step S111: Yes, Step S121: No, and Step S131: Yes, respectively), whether the length Pf of the compulsive control period is longer than the predetermined threshold Pth or not is judged in Step S150. Thereafter, the exit restriction action is performed in Step S103 when the length Pf of the compulsive control period is the predetermined threshold Pth or less, while the exit restriction action is canceled in Step S104 when the length Pf of the compulsive control period is longer than the predetermined threshold Pth.

However, it may be configured such that the exit restriction action is performed first and thereafter whether the length Pf of the compulsive control period is longer than the predetermined threshold Pth or not is judged and when the obstacle detection part 110 is not in the state where it can operate normally, and the exit restriction action is canceled in Step S104 when the length Pf of the compulsive control period is longer than the predetermined threshold Pth (refer to Working Example which will be mentioned later in detail).

Working Example

Figure 17:
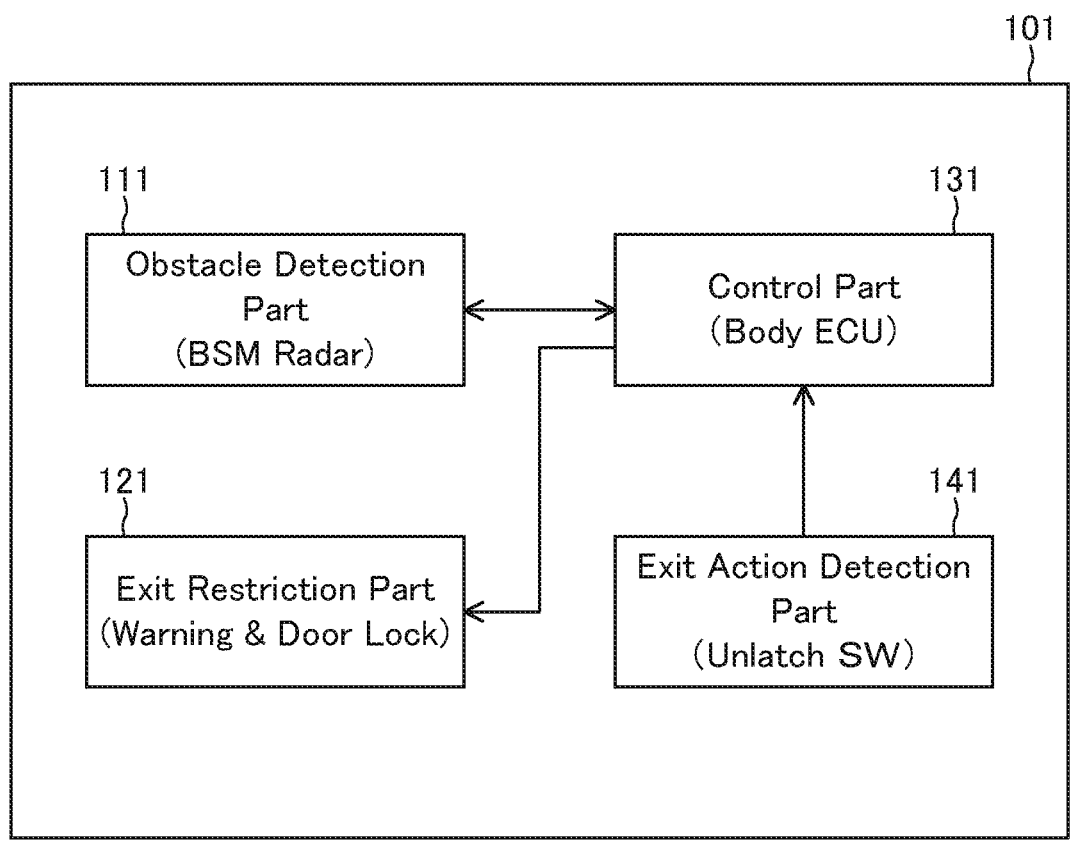
FIG. 17 is a schematic block diagram for showing an example of a configuration of a vehicle exit assist apparatus according to a working example of the present invention (working example apparatus).

Here, a specific example of a vehicle exit assist apparatus according to one working example of the present invention (which may be referred to as a "working example apparatus" hereafter) will be explained in detail below, referring to drawings.
<Configuration>
FIG. 17 is a schematic block diagram for showing an example of a configuration of the working example apparatus. The working example apparatus 101 is a vehicle exit assist apparatus which comprises a BSM radar as the obstacle detection part 111, a warning device and a door lock apparatus as the exit restriction part 121, and a body ECU as the control part 131. The control part 131 (body ECU) is configured to make the exit restriction part 121 perform the exit restriction action (a warning and door lock) at least on a door nearest to an obstacle when an obstacle is detected by the obstacle detection part 111 (perform the regular control).

Furthermore, in the working example apparatus 101, an operation to turn on an unlatch switch (unlatch SW) by an occupant in a self-vehicle is detected as the exit action (action to exit (get out)). Namely, the working example apparatus 101 comprises an unlatch SW as the exit action detection part 141. In addition, the control part 131 is configured to start up the obstacle detection part 111 and the exit restriction part 121 when the exit action is detected by the exit action detection part 141 in a state where the obstacle detection part 111 and/or the exit restriction part 121 are not working (perform the restart control).

Figure 18:
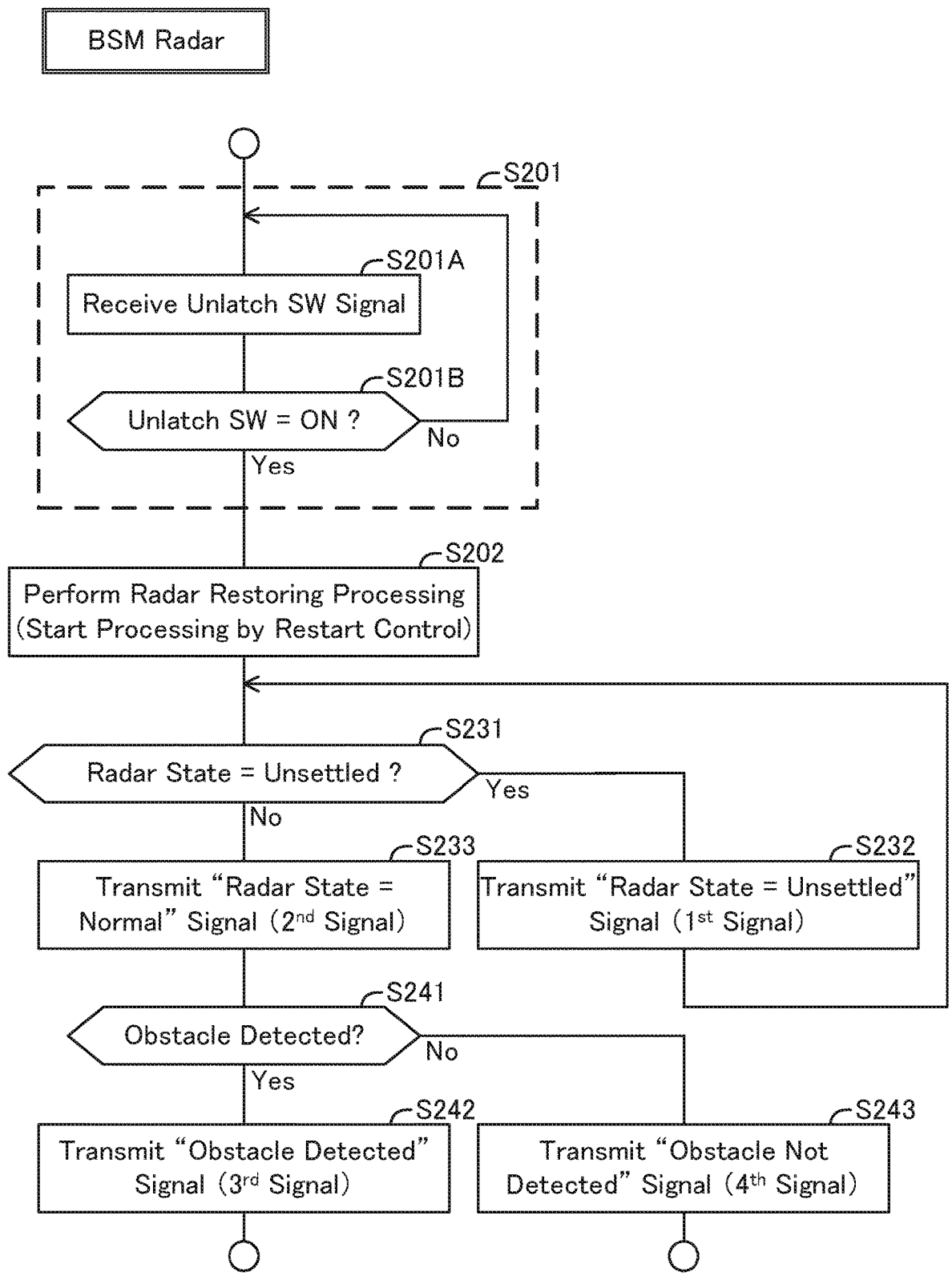
FIG. 18 is a flowchart for showing an example of restart control and a subsequent flow of processing performed by an ECU of the obstacle detection part which the working example apparatus comprises.

The obstacle detection part 111 is configured to be able to perform start processing (restoring processing) by the restart control when the ignition switch of the self-vehicle is turned off and thereafter the obstacle detection part 111 changes into the sleep state and the exit action detection signal transmitted from the control part 131 is received. Furthermore, the obstacle detection part 111 is configured to transmit a signal corresponding to an operating state after the restoring processing to the control part 131. In addition, the obstacle detection part 111 is configured to transmit an obstacle detection signal that is a signal indicating whether an obstacle existing around the self-vehicle to the control part 131 after a state where the obstacle detection part 111 can operate normally is attained.
<Operation>
FIG. 18 is a flowchart for showing an example of the restart control and a subsequent flow of processing performed by an ECU which the obstacle detection part 111 comprises. This flowchart includes Step S201A, S201B and S202 corresponding to the restart control shown in FIG. 4, Steps S231 to S233 corresponding to the operating state notification routine shown in FIG. 10, and Steps S241 to S243 in which the obstacle detection signal indicating whether an obstacle exists around the self-vehicle or not is transmitted to the control part.

The CPU of the ECU which realizes the function as the obstacle detection part 111 in the sleep state comprises receives the exit action detection signal from the control part 131 in Step S201A, and judges whether the exit action is detected in the following Step S201B. Specifically, the CPU receives the signal (unlatch SW signal) corresponding to an operation of the unlatch SW from the control part 131 in Step S201A. Next, the CPU judges whether the signal is a signal indicating that "the unlatch SW has been turned on (unlatch SW=ON)" or not in Step S201B. Namely, Step S201A and S201B are equivalent to Step S201 in the flowchart shown in FIG. 4.

When the signal received from the control part 131 is not the signal indicating "unlatch SW=ON" (namely, when it is not the exit action detection signal), the CPU judges as "No" in Step S201B, and returns processing to Step S201A. On the other hand, when the signal received from the control part 131 is the signal indicating "unlatch SW=ON", the CPU judges as "Yes" in Step S201B, progresses processing to the following Step S202, and performs the start processing (restoring processing) of the obstacle detection part 111. Although it not illustrated, the start processing (restoring processing) of the exit restriction part 121 is similar to the above.

Next, the CPU progresses processing to Step S231, and judges whether the BSM radar as the obstacle detection part 111 is in an "unsettled state" that is a state where the obstacle detection part 111 cannot yet operate normally. When the obstacle detection part 111 is in the unsettled state, the CPU judges as "Yes" in Step S231, and progresses processing to the following Step S232. The CPU transmits a signal (first signal) indicating that the obstacle detection part 111 is in the unsettled state to the control part 131 in Step S232, and returns processing Step S231. On the other hand, when the obstacle detection part 111 is in the state where it can operate normally, the CPU judges as "No" in Step S231, and progresses processing to the following Step S233. The CPU transmits a signal (second signal) indicating that the obstacle detection part 111 is in the state where the obstacle detection part 111 can operate normally to the control part 131 in Step S233, and progresses processing to the following Step S241.

In Step S241, the CPU detects whether an obstacle, such as an object, animal, a pedestrian, a vehicle which exists within a predetermined distance from the self-vehicle, and an approaching body predicted to reach within a predetermined distance from the self-vehicle within predetermined time, etc., exists around the self-vehicle or not, for example. When the obstacle which exists around the self-vehicle is detected, the CPU judges as "Yes" in Step S241, progresses processing to the following Step S242, and transmits a signal (third signal) indicating that an obstacle exists around the self-vehicle to the control part 131. On the other hand, when the obstacle which exists around the self-vehicle is not detected, the CPU judges as "No" in Step S241, progresses processing to the following Step S243, and transmits a signal (fourth signal) indicating that the obstacle does not exist around the self-vehicle to the control part 131.

As mentioned above, in the flowchart shown in FIG. 18, when the signal received from the control part 131 is not the signal indicating "unlatch SW=ON" (namely, when it is not the exit action detection signal), the CPU judges as "No" in Step S201B, and returns processing to Step S201A. Moreover, when the obstacle detection part 111 is in the unsettled state, the CPU judges as "Yes" in Step S231, transmits the first signal to the control part 131 in the following Step S232, and returns processing to Step S231. However, the CPU may once end the routine and repeat the routine at a predetermined interval, for example, as shown in FIG. 4 and FIG. 10, etc., rather than returning processing to a previous step in this way.

Figure 19:
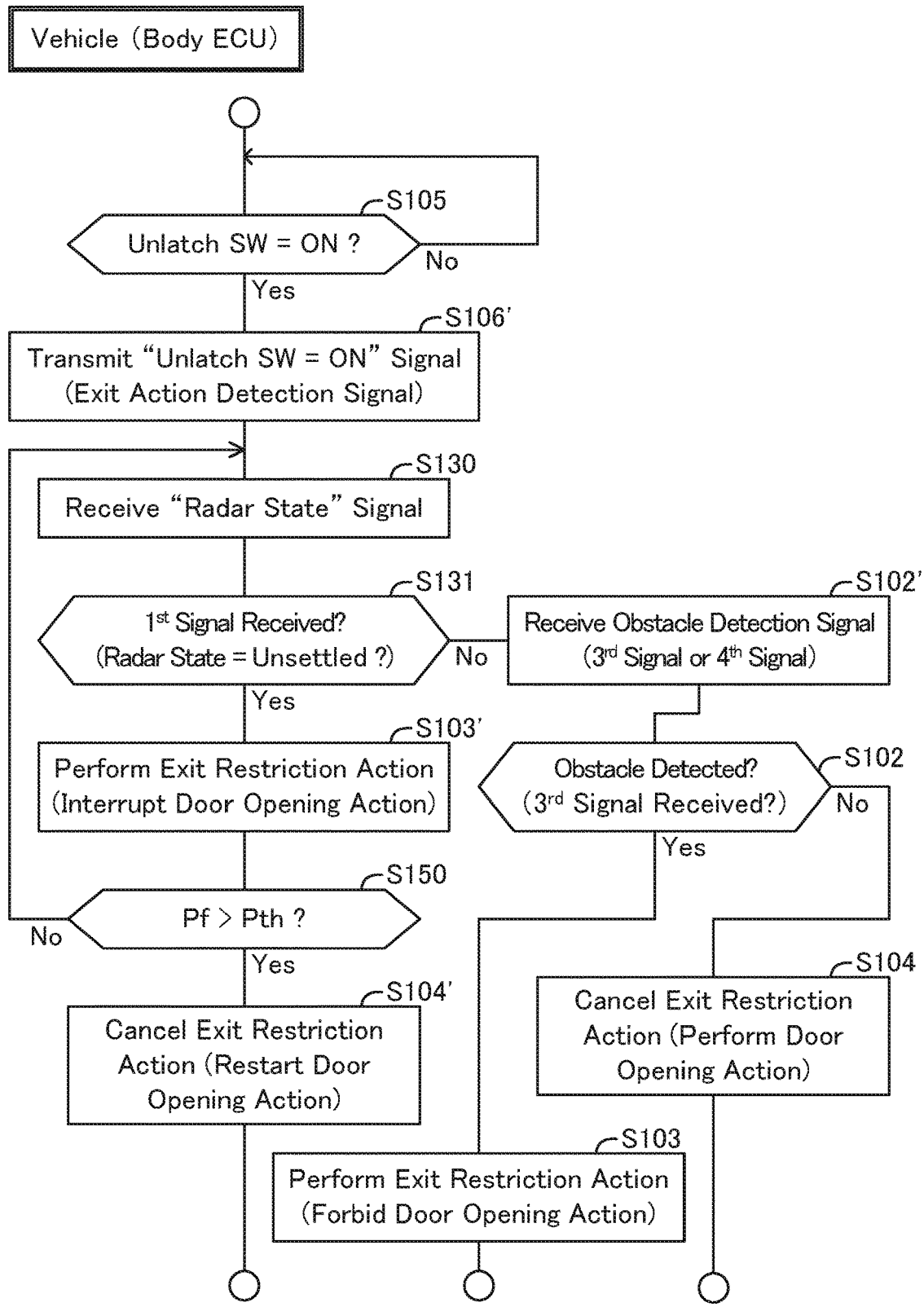
FIG. 19 is a flowchart for showing an example of an exit assist routine performed by a body ECU of a vehicle on which the working example apparatus is mounted.

FIG. 19 is a flowchart for showing an example of the exit assist routine performed by a body ECU of a vehicle on which the working example apparatus 101 is mounted. This flowchart corresponds to the exit assist routine shown in FIG. 14. However, similarly to the exit assist routine shown in FIG. 3 regarding the first apparatus 100 according to Modification 1-1, the restart control performed by the body ECU consists of Step S105, in which whether the exit action is detected or not is judged, and Step S106', in which the exit action detection signal is transmitted to the obstacle detection part 111. Namely, the start processing (restoring processing) of the obstacle detection part 111 is performed by the ECU which the obstacle detection part 111 comprises as mentioned above. Although it not illustrated, the start processing (restoring processing) of the exit restriction part 121 is similar to the above.

Furthermore, as mentioned above, in the exit assist routine shown in FIG. 14, whether the length Pf of the compulsive control period is longer than the predetermined threshold Pth or not is judged in Step S150 when the obstacle detection part 110 in not in the state where the obstacle detection part 110 can operate normally (when it is in the unsettled state). Thereafter, the exit restriction action is performed in Step S103 when the length Pf of the compulsive control period is the predetermined threshold Pth or less, while the exit restriction action is canceled in Step S104 when the length Pf of the compulsive control period is longer than the predetermined threshold Pth.

However, in the exit assist routine shown in FIG. 19 regarding the working example apparatus, when the obstacle detection part 111 is in the unsettled state, the exit restriction action is performed first and thereafter whether the length Pf of the compulsive control period is longer than the predetermined threshold Pth or not is judged. Thereafter, when the length Pf of the compulsive control period is longer than the predetermined threshold Pth, the exit restriction action is canceled in Step S104.

Specifically, the CPU which the body ECU comprises judges whether the exit action (action of an occupant in the self-vehicle to exit) is detected by the exit action detection part 140 or not is judged in Step S105. In the working example apparatus 101, the CPU judges whether the unlatch SW as the exit action detection part 141 is turned on or not. When the unlatch SW is not turned on, the CPU judges as "No" in Step S105, returns processing to the beginning of the routine, and repeatedly performs Step S105. On the other hand, when the unlatch SW is turned on, the CPU progresses processing to the following Step S106', and transmits the signal (exit action detection signal) indicating that "the unlatch SW is turned on (unlatch SW=ON)" to the obstacle detection part 111 and the exit restriction part 121. The exit action detection signal transmitted in this way is used for judgment in Step S201B in the flowchart shown in FIG. 18.

Next, the CPU progresses processing to Step S130, and receives the signal indicating the operating state of the BSM radar as the obstacle detection part 111. This signal is the signal transmitted from the BSM radar in Step S232 or S233 in the flowchart shown in FIG. 18. Furthermore, the CPU progresses processing to the following Step S131, and judges whether the signal received in Step S130 is the first signal or not. As mentioned above, the first signal is a signal indicating that the BSM radar is in the "unsettled state" where the BSM radar cannot yet operate normally.

When the signal received in Step S130 is not the first signal, the CPU judges as "No" in Step S131, progresses processing to the following Step S102', and receives the obstacle detection signal (the third signal or the fourth signal) transmitted from the obstacle detection part 111. Next, the CPU progresses processing to Step S102, and judges whether an obstacle which exists around the self-vehicle is detected by the obstacle detection part 111 or not. In the working example apparatus 101, the CPU judges whether the obstacle detection signal received from the obstacle detection part 111 in Step S102' is the third signal (namely, a signal indicating that an obstacle exists around the self-vehicle) or not.

When an obstacle is not detected, the CPU judges as "No" in Step S102, progresses processing to the following Step S104, and cancels the exit restriction action when the exit restriction action is being performed by the exit restriction part 121. Thereby, an unlatching and/or opening action of a door due to the unlatch SW having been turned on by the occupant of the self-vehicle is performed. On the other hand, when an obstacle is detected, the CPU judges as "Yes" in Step S102, progresses processing to the following Step S103, and makes the exit restriction part 121 perform the exit restriction action.

By the way, when the signal received in Step S130 is the first signal, the CPU judges as "Yes" in Step S131, progresses processing the following Step S103', and makes the exit restriction part 121 perform the exit restriction action (perform the compulsive control). Namely, when the BSM radar is in the "unsettled state" where the BSM radar cannot yet operate normally, the door opening action based on the exit action by the occupant of the self-vehicle is interrupted irrespective of whether an obstacle is detected or not. Next, the CPU progresses processing to Step S150, and judges whether the length Pf of the period (compulsive control period) in which the exit restriction action is continuously performed by the compulsive control (length of a period in which a state where the first signal is continuously received continues) is longer than the predetermined threshold Pth or not.

When the length Pf of the compulsive control period is longer than the threshold Pth, the CPU judges as "Yes" in Step S150, progresses processing to the following Step S104', and cancels the exit restriction action currently performed by the exit restriction part 121. Thereby, the unlatching and/or opening action of the door interrupted by the exit restriction action which the exit restriction part 121 is made to perform in Step S103' is restarted. On the other hand, when the length Pf of the compulsive control period is the threshold Pth or less, the CPU judges as "No" in Step S150, returns processing to Step S130, and receives the signal indicating the operating state of the BSM radar as the obstacle detection part 111 again. Thereby, the exit restriction action currently performed by the exit restriction part 121 is continued until the length Pf of the compulsive control period becomes longer than the threshold Pth or the fourth signal (namely, the signal indicating that an obstacle does not exist around the self-vehicle) is received from the obstacle detection part 111 which is operating normally.

<Effectiveness>

As mentioned above, in the working example apparatus 101, even in the state where the obstacle detection part 111 and/or the exit restriction part 121 are not working, the restart control is performed by the control part 131 and the obstacle detection part 111 and the exit restriction part 121 are started (the regular control is performed) when the exit action is detected by the exit action detection part 141. Namely, the security when an occupant exits from the self-vehicle can be improved more certainly.

Moreover, after the obstacle detection part 111 and/or the exit restriction part 121 stop operation due to the ignition switch being turned off, the obstacle detection part 111 and the exit restriction part 121 are not started unless the ignition switch is turned on again or the exit action is detected by the exit action detection part 141 to perform the above-mentioned restart control, for example. Therefore, the possibility that the regular control may be performed to give discomfort to the occupant and/or consume unnecessary electric power in a state where the vehicle exit assist is not needed, such as a state where no occupant is in the self-vehicle and a state where no occupant is going to exit, for example, can be reduced. Namely, in accordance with the working example apparatus 101, the security when the occupant exits can be improved more certainly, while reducing unnecessary power consumption.

Furthermore, in accordance with the working example apparatus 101, the exit restriction action is performed by the exit restriction part 121 irrespective of whether an obstacle is detected by the obstacle detection part 111 or not during the period in which the first signal indicating that the obstacle detection part 111 is in a state where the obstacle detection part 111 cannot yet operate normally is received. Therefore, the possibility that the security when an occupant exits from the self-vehicle falls due to the fact that an obstacle cannot be normally detected even though the obstacle exists around the self-vehicle since the obstacle detection part 111 has not reached the state where it can operate normally can be reduced. Namely, the security when an occupant exits from the self-vehicle can be improved more certainly.

In addition, in the working example apparatus 101, the control part 131 is configured to cancel the exit restriction action when the length Pf of the compulsive control period becomes longer than the predetermined threshold Pth. Therefore, in accordance with the working example apparatus 101, the possibility that the exit restriction action by the compulsive control is performed for an excessively long period to give discomfort to the occupant and/or consume unnecessary electric power can be reduced.

Although some the embodiments and modifications which have specific configurations have been explained, sometimes referring to accompanying drawings, as the above, for the purpose of explaining the present invention, it should not be interpreted that the scope of the present invention is limited to these exemplary embodiments and modifications, and it is needless to say that modifications can be properly added within the limits of the matter described in the claims and the specification. For example, as long as intended effects can be attained, the execution sequence of the steps included in the flowcharts which show the above-mentioned various routines can be changed.

REFERENCE SIGNS LIST

100 and 101: Vehicle Exit Assist Apparatus, 110 and 111: Obstacle Detection Part, 120 and 121: Exit Restriction Part, 130 and 131: Control Part, 140 and 141: Exit Action Detection Part.

The invention claimed is:

1. A vehicle exit assist apparatus which comprises:
   a sensor configured to detect an obstacle existing around a self-vehicle;
   a door lock configured to perform an exit restriction action that is an action including a warning action which is an action to issue a warning on a door of said self-vehicle and/or a door opening restriction action which is an action to restrict opening of said door;
   a detector configured to detect an exit action that is an action of an occupant of said self-vehicle to exit; and
   an electronic control unit (ECU), including a processor, programmed to:
   based upon a condition in which said obstacle is detected by said sensor, perform regular control that is control, in which said door lock is controlled to perform said exit restriction action at least on said door nearest to said obstacle detected by said sensor, and
   based upon a condition that (i) said sensor and/or said door lock are not working and (ii) said exit action of the occupant is detected by said detector, perform restart control that is control, in which said sensor and said door lock are restarted.

2. The vehicle exit assist apparatus according to claim 1, wherein:
   said door lock comprises at least one warning device chosen from a group consisting of a sound generation device that is a device to generate sound as said warning, a light generation device that is a device to generate light as said warning, a vibration generation device that is a device to generate vibration as said warning, and an image display device to display images and/or letters as said warning, and
   said warning action includes an action to issue said warning with said warning device.

3. The vehicle exit assist apparatus according to claim 1, wherein:
   said door lock comprises a door lock apparatus that is an apparatus to lock said door or maintain a state where said door is locked, and
   said door opening restriction action includes an action to lock said door with said door lock apparatus or an action to maintain the state where said door is locked.

4. The vehicle exit assist apparatus according to claim 1, wherein:
   said detector comprises at least one chosen from a group consisting of a door lever sensor to detect an operation of a door lever of said door, a door switch for operating an electronic latch apparatus of said door, a touch sensor to detect contact by said occupant to said door lever and/or said door switch, a seating sensor to detect a sitting posture of said occupant, and a motion sensor to detect movement of said occupant, and is configured to detect said exit action based on a signal output from the detector.

5. The vehicle exit assist apparatus comprising:
   a sensor configured to detect an obstacle existing around a self-vehicle; a door lock configured to perform an exit restriction action that is an action including a warning action which is an action to issue a warning on a door of said self-vehicle and/or a door opening restriction action which is an action to restrict opening of said door;
   a detector configured to detect an exit action that is an action of an occupant of said self-vehicle to exit; and
   an electronic control unit (ECU), including a processor, programmed to:
   perform regular control that is control, in which said door lock is controlled to perform said exit restriction action at least on said door nearest to said obstacle when said obstacle is detected by said sensor, and
   perform restart control that is control, in which said sensor and said door lock are restarted when said exit action is detected by said detector in a state where said sensor and/or said door lock are not working, wherein:
   said sensor is configured to transmit a predetermined second signal to said ECU during a period in which said sensor is in a state where said sensor can operate normally after starting-up, and
   said ECU is further programmed to perform said regular control during a period in which said second signal is received and to perform compulsive control that is control, in which said door lock is made to perform said exit restriction action irrespective of whether said obstacle is detected, during a period in which said second signal is not received.

6. A vehicle exit assist apparatus comprising:
a sensor configured to detect an obstacle existing around a self-vehicle; a door lock configured to perform an exit restriction action that is an action including a warning action which is an action to issue a warning on a door of said self-vehicle and/or a door opening restriction action which is an action to restrict opening of said door;
a detector configured to detect an exit action that is an action of an occupant of said self-vehicle to exit; and
an electronic control unit (ECU), including a processor, programmed to:
perform regular control that is control, in which said door lock is controlled to perform said exit restriction action at least on said door nearest to said obstacle when said obstacle is detected by said sensor, and
perform restart control that is control, in which said sensor and said door lock are restarted when said exit action is detected by said detector in a state where said sensor and/or said door lock are not working, wherein:
said sensor is configured to transmit a predetermined first signal to said ECU during a period in which said sensor is not in a state where said sensor can operate normally after starting-up, and to transmit a predetermined second signal to said ECU during a period in which said sensor is in a state where said sensor can operate normally after starting-up, and
said ECU is further programmed to perform said regular control during a period in which said second signal is received and to perform compulsive control that is control, in which said door lock is made to perform said exit restriction action irrespective of whether said obstacle is detected, during a period in which said first signal is received.

7. The vehicle exit assist apparatus according to claim 6, wherein:
said ECU is further programmed to perform said compulsive control during a period in which neither said first signal nor said second signal is received.

8. The vehicle exit assist apparatus according to claim 7, wherein said ECU is further programmed to:
perform an abnormal detection warning action that is an action to issue an abnormal detection warning that is a warning for showing that said sensor is not operating normally, wherein:
said ECU is further programmed to perform said compulsive control and abnormality warning control that is control, in which said abnormal detection warning action is performed, during a period in which neither said first signal nor said second signal is received.

9. A vehicle exit assist apparatus comprising:
a sensor configured to detect an obstacle existing around a self-vehicle; a door lock configured to perform an exit restriction action that is an action including a warning action which is an action to issue a warning on a door of said self-vehicle and/or a door opening restriction action which is an action to restrict opening of said door;
a detector configured to detect an exit action that is an action of an occupant of said self-vehicle to exit; and
an electronic control unit (ECU), including a processor, programmed to:
perform regular control that is control, in which said door lock is controlled to perform said exit restriction action at least on said door nearest to said obstacle when said obstacle is detected by said sensor, and
perform restart control that is control, in which said sensor and said door lock are restarted when said exit action is detected by said detector in a state where said sensor and/or said door lock are not working, wherein:
said sensor is configured to transmit a predetermined first signal to said ECU during a period in which said sensor is not in a state where said sensor can operate normally after starting-up, and
said ECU is further programmed to perform said regular control during a period in which said first signal is not received and to perform compulsive control that is control, in which said door lock is made to perform said exit restriction action irrespective of whether said obstacle is detected by said sensor or not, during a period in which said first signal is received.

10. The vehicle exit assist apparatus according to claim 9, wherein:
said ECU is further programmed to cancel said exit restriction action when the length of a period, for which said compulsive control is being continuously performed, is longer than a predetermined threshold value.

* * * * *